Feb. 21, 1933.  T. R. HARRISON  1,898,183
RECORDING AND CONTROL SYSTEM AND APPARATUS THEREFOR
Filed Nov. 4, 1926  10 Sheets-Sheet 2
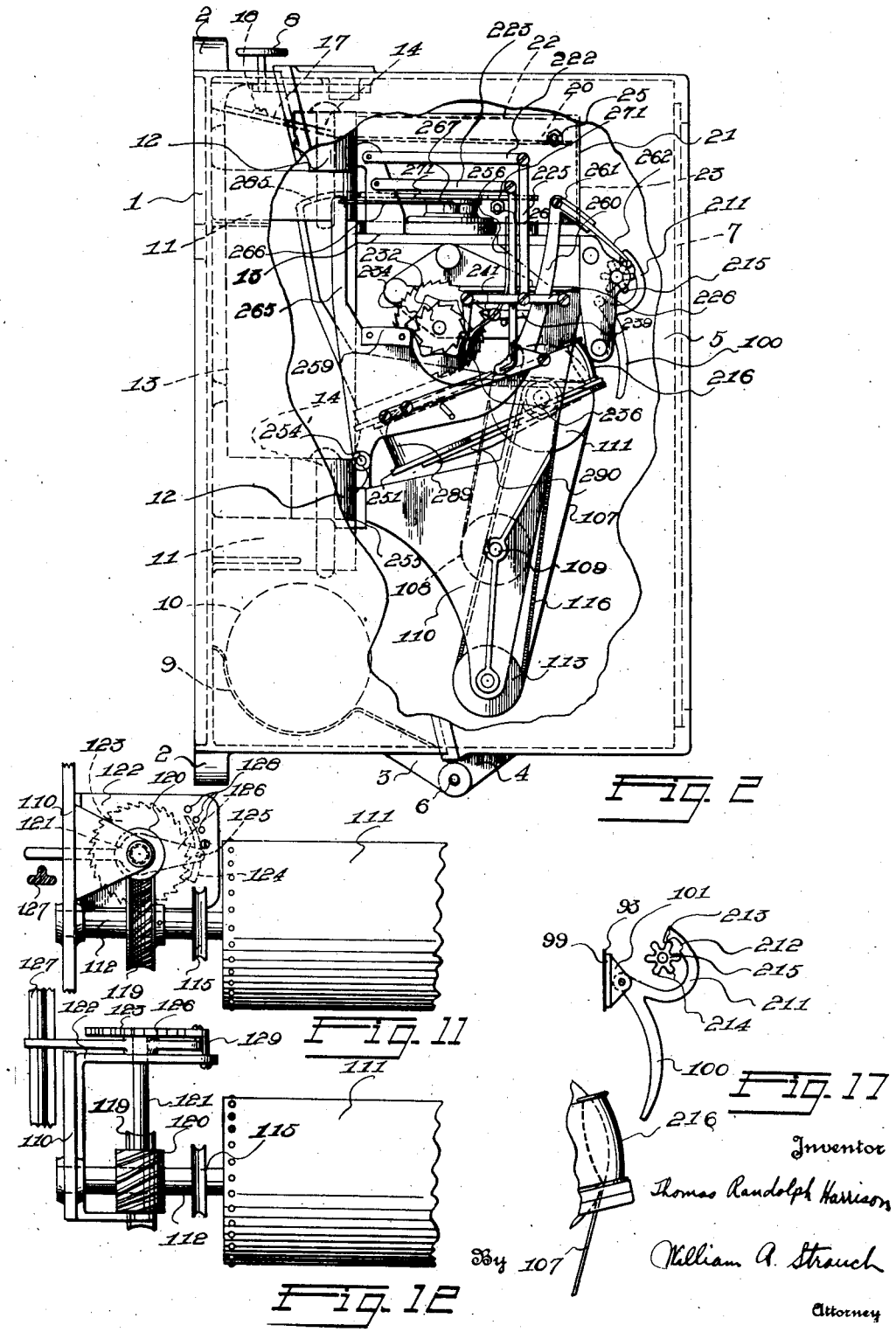

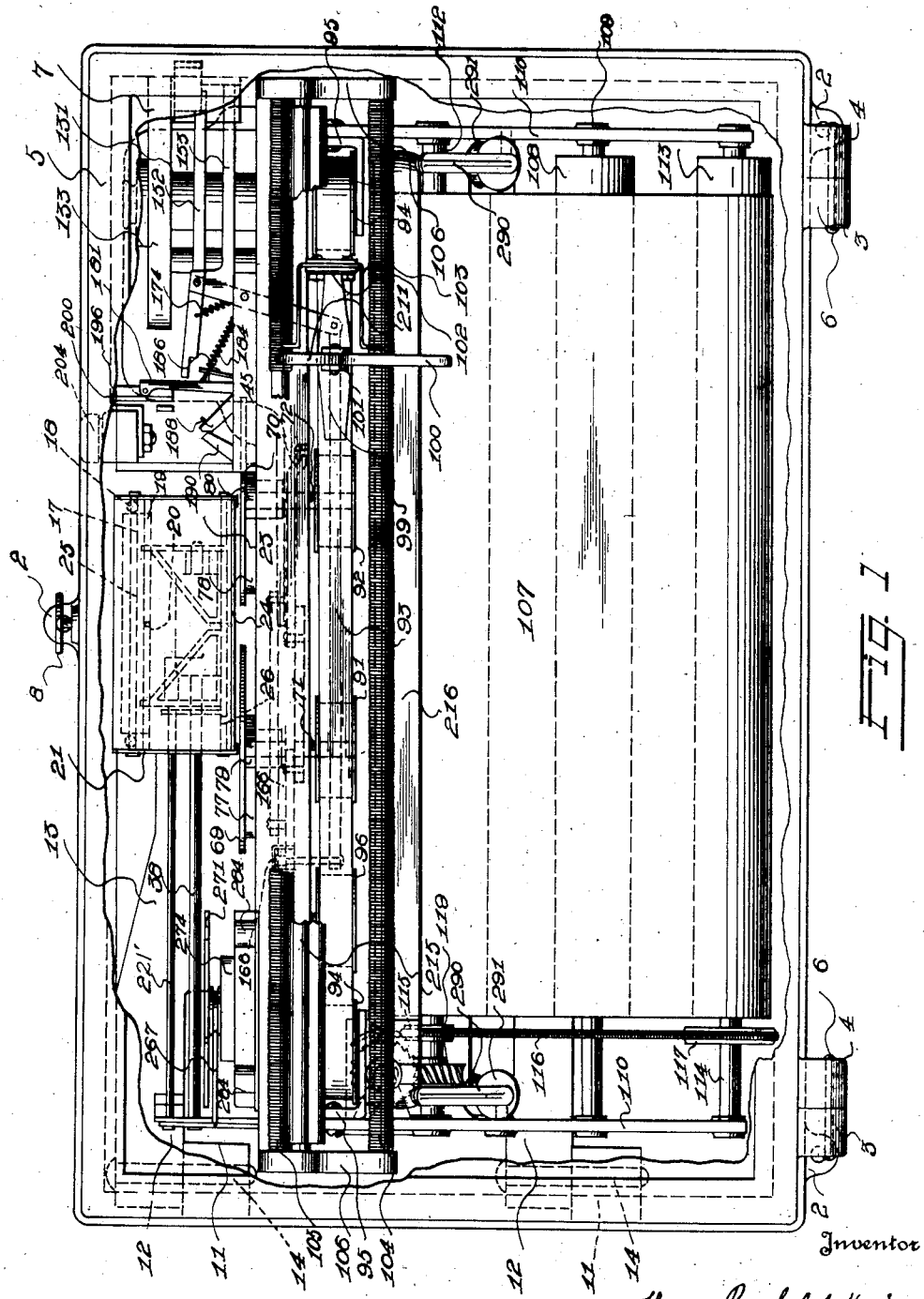

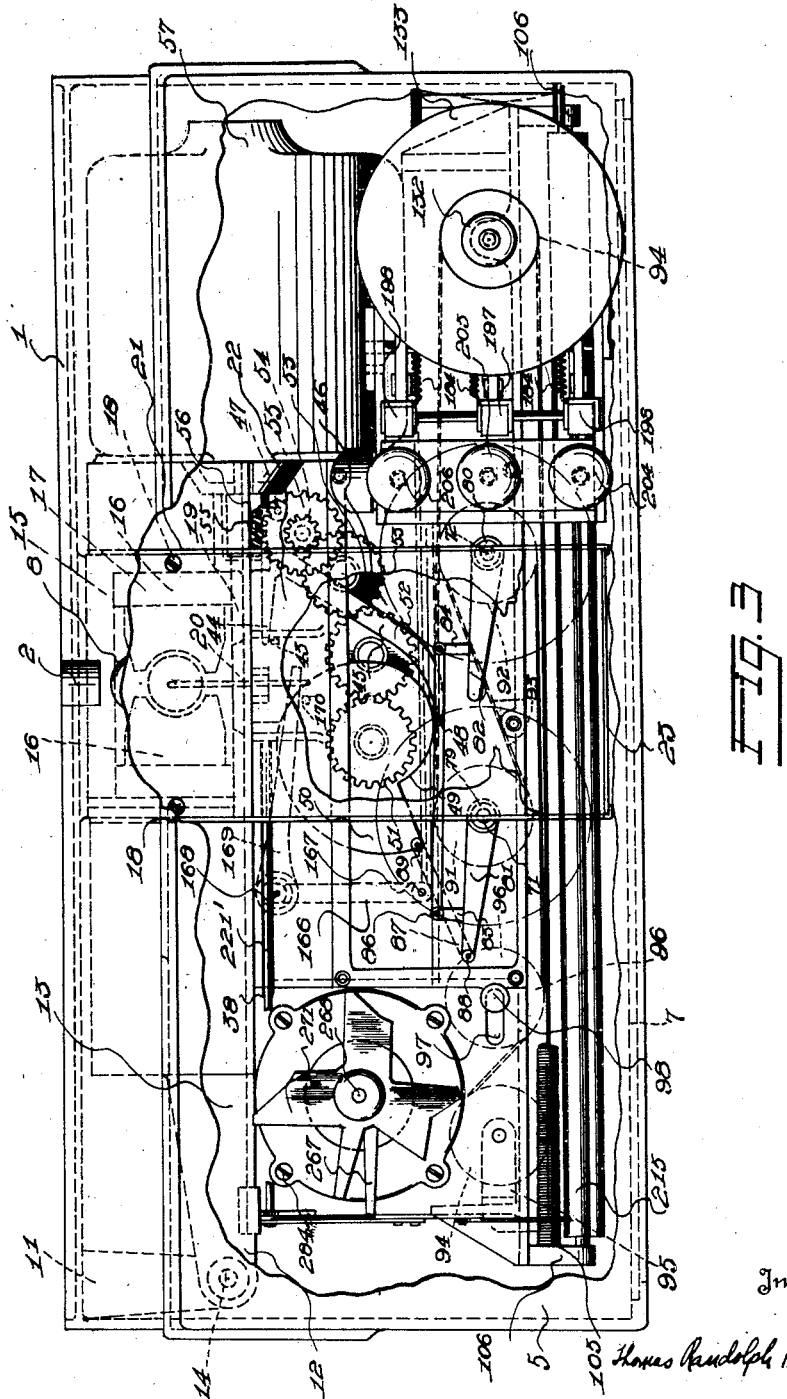

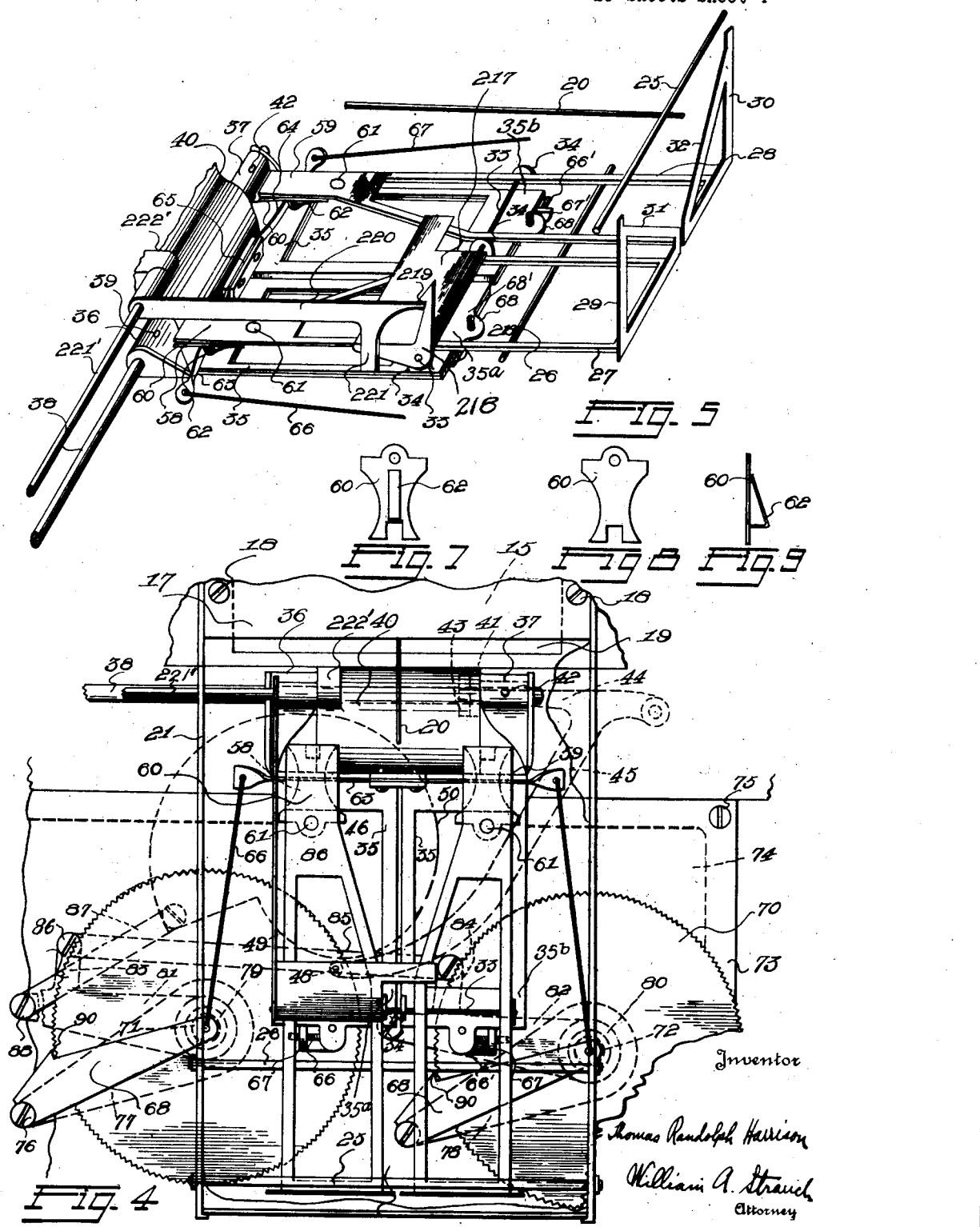

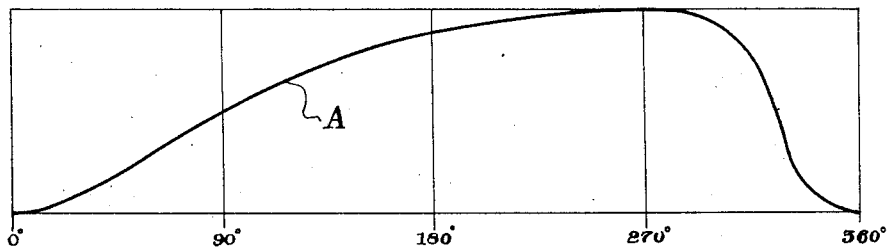
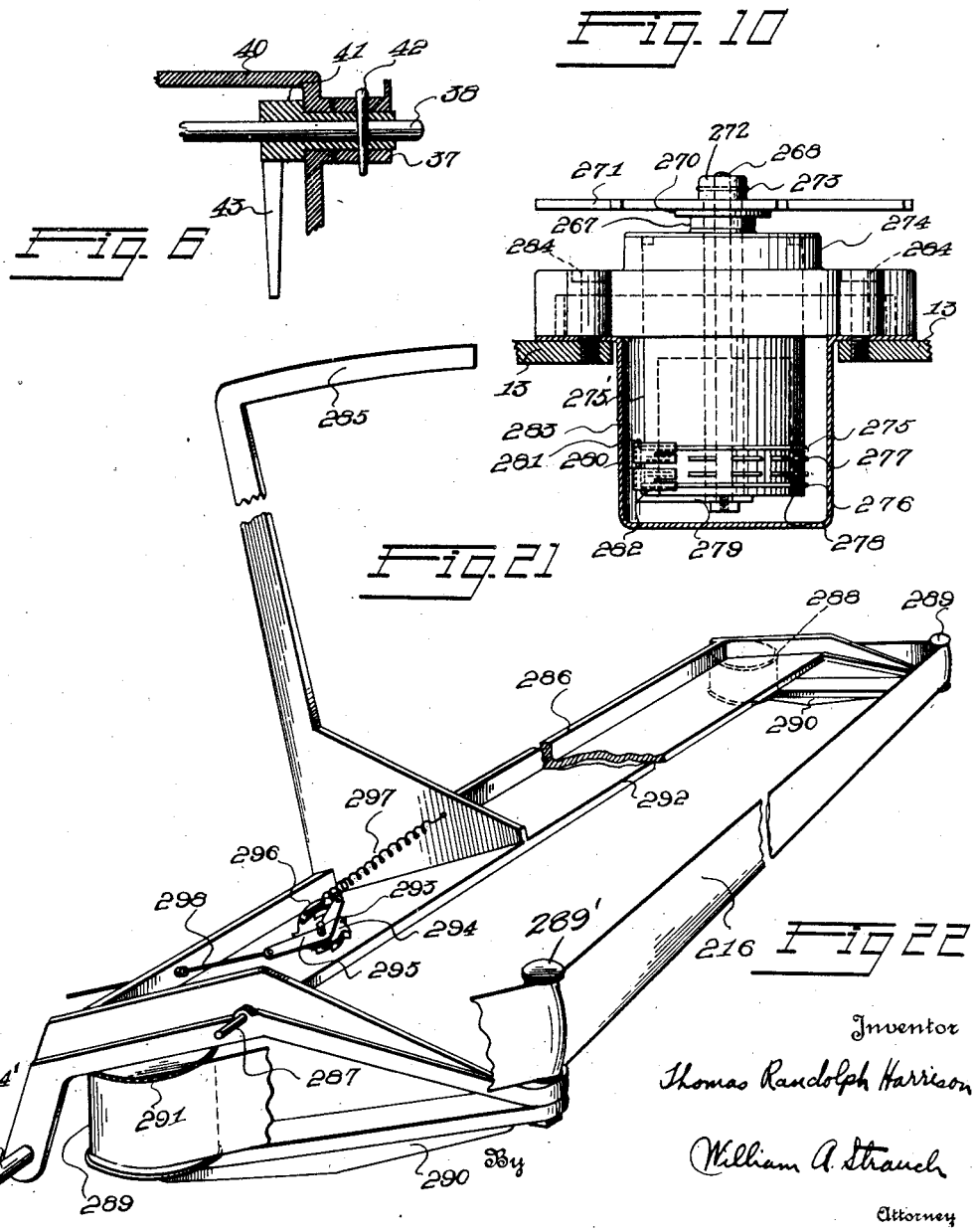

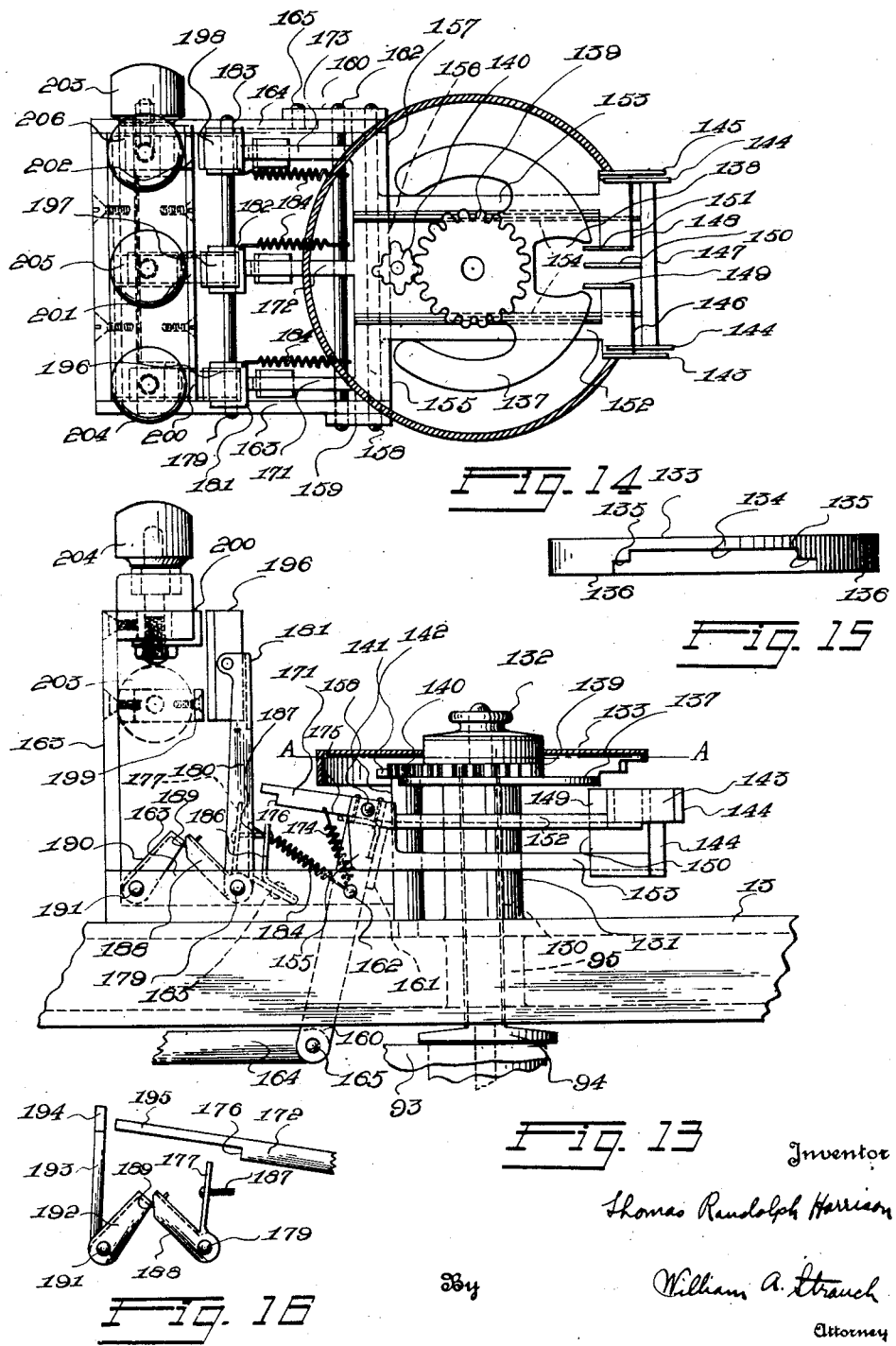

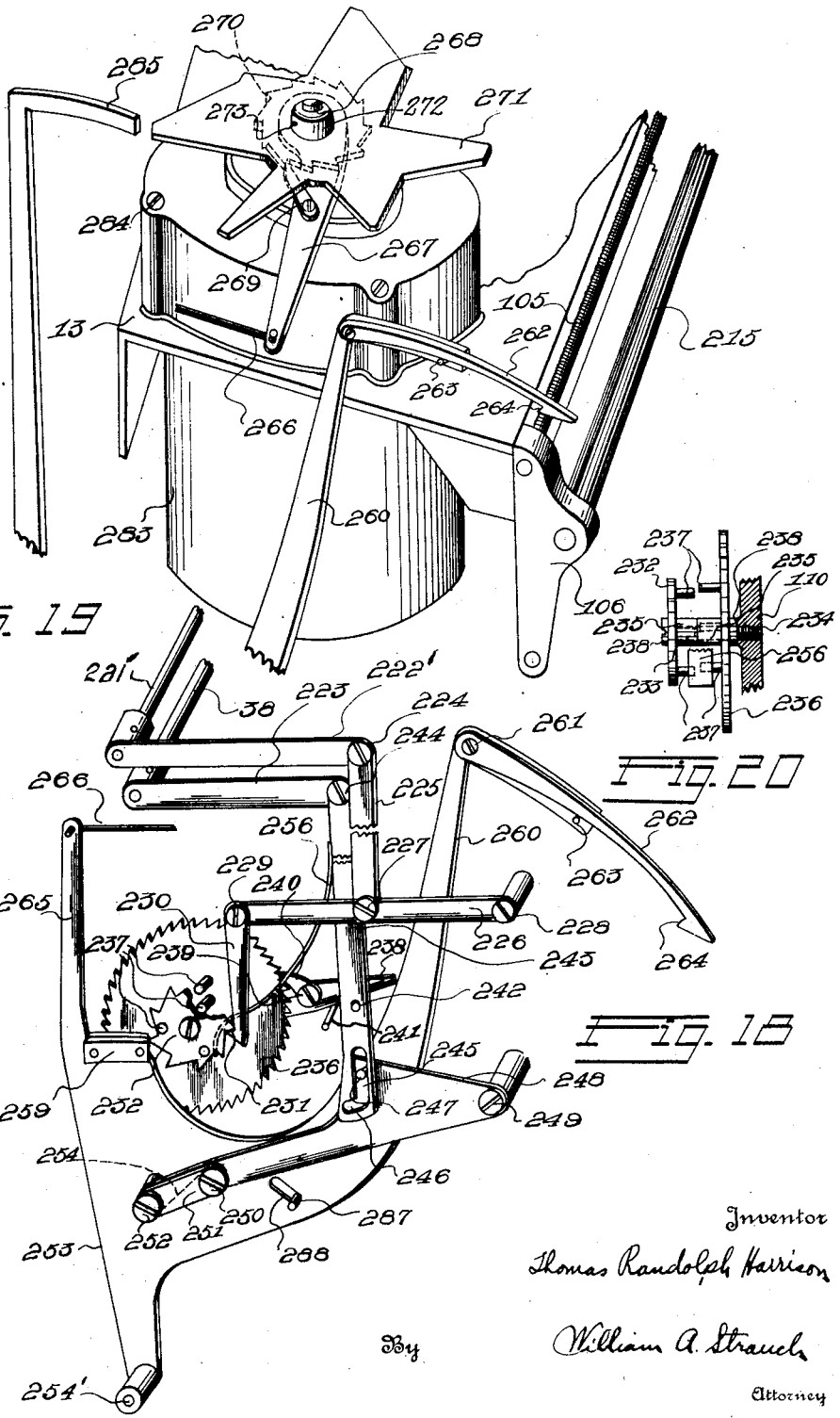

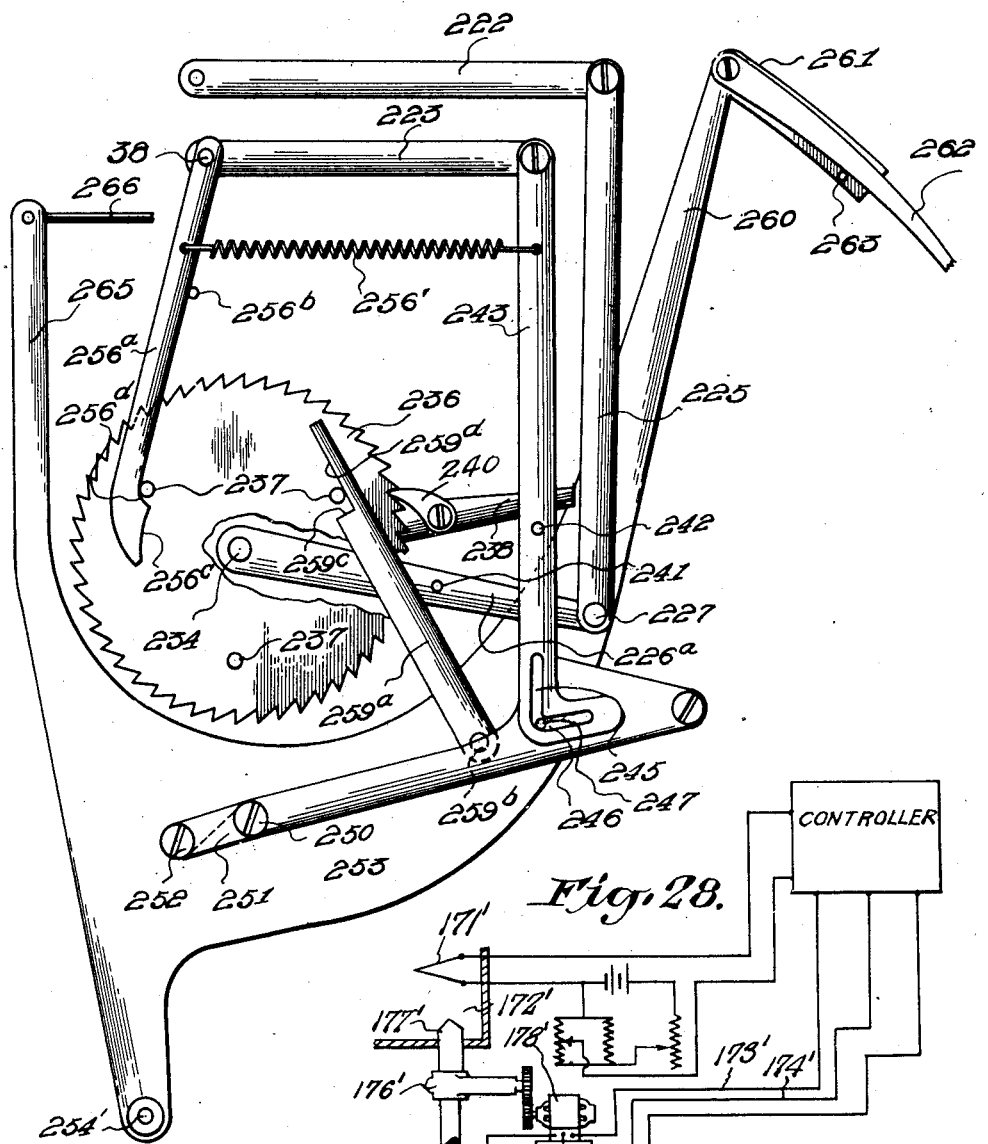

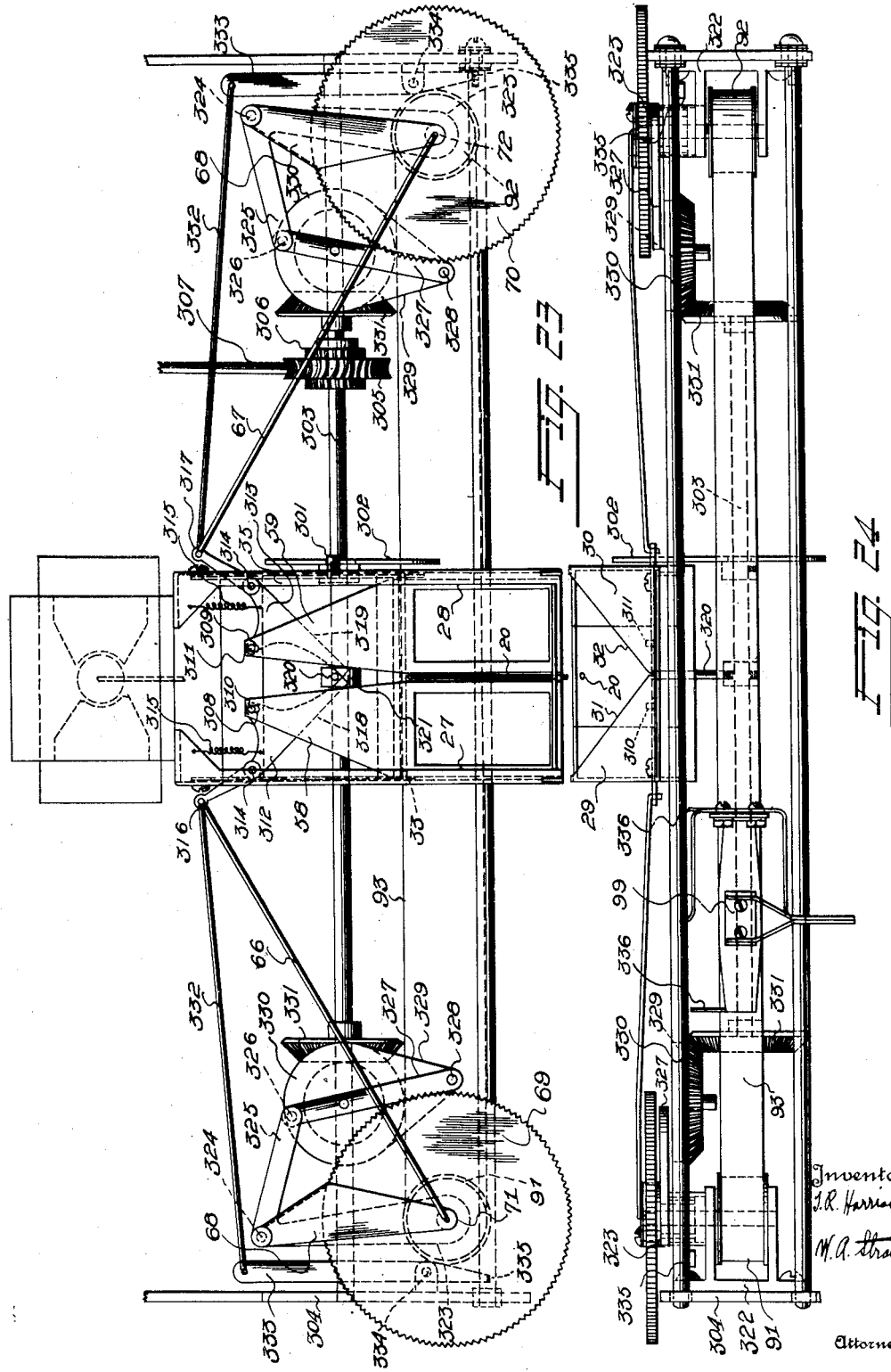

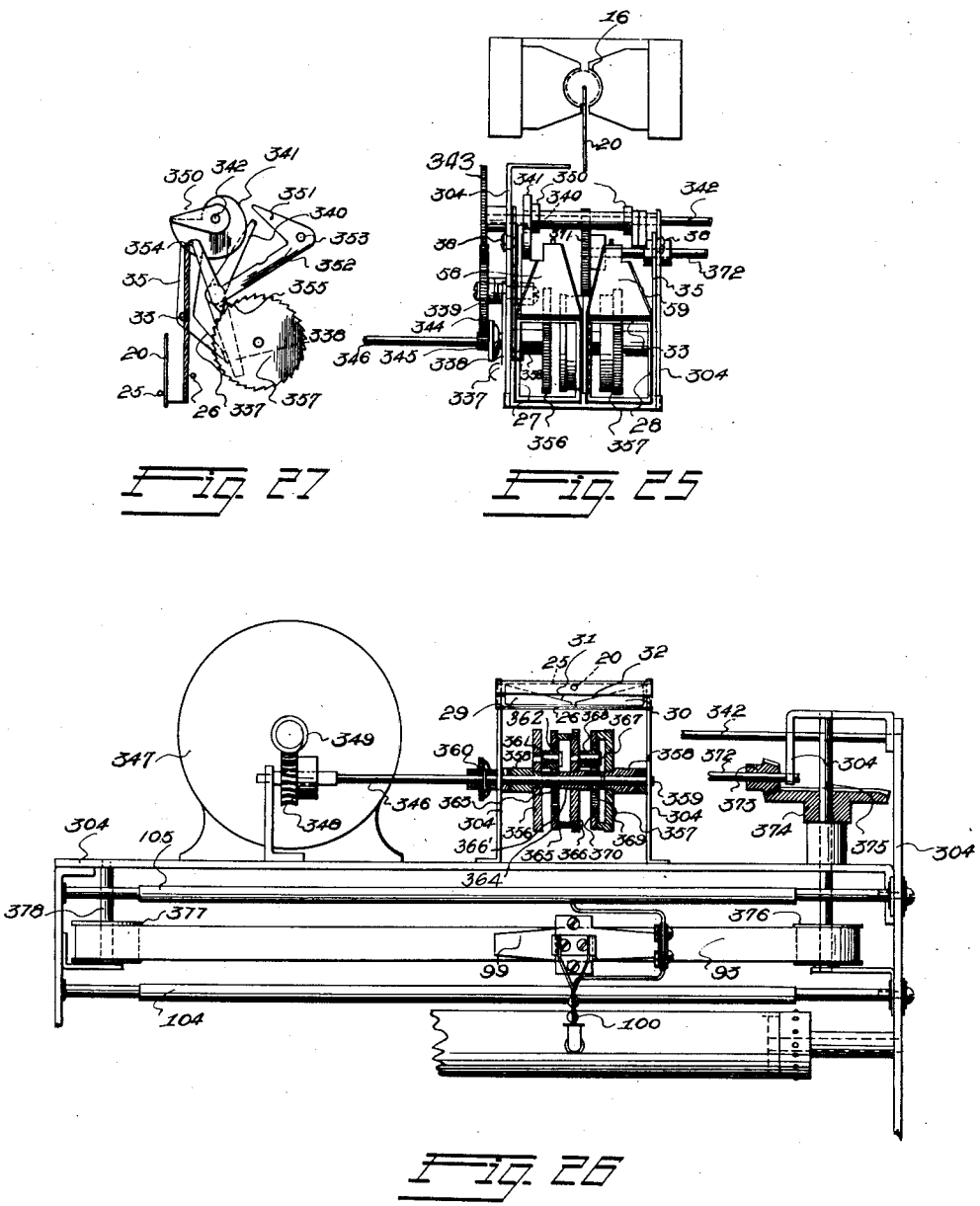

Patented Feb. 21, 1933

1,898,183

UNITED STATES PATENT OFFICE

THOMAS RANDOLPH HARRISON, OF WYNCOTE, PENNSYLVANIA, ASSIGNOR TO THE BROWN INSTRUMENT COMPANY, OF PHILADELPHIA, PENNSYLVANIA, A CORPORATION OF PENNSYLVANIA

RECORDING AND CONTROL SYSTEM AND APPARATUS THEREFOR

Application filed November 4, 1926. Serial No. 146,141.

The present invention relates to improvements in automatic control systems and apparatus therefor.

More particularly the invention disclosed in this application which is a continuation in part of application Serial Number 701,829, filed March 25, 1924, relates to systems and apparatus for controlling recorders, switches, motors, valves, rheostats, and like devices in response to mechanical, chemical, electrical or other physical changes of conditions in order to make a record of the changes, or to maintain predetermined physical conditions at a controlled point or points, or both. The invention is especially useful in temperature recording and pyrometric control systems where it is desired to record on a common instrument the conditions of temperatures at one or more remote points, for example in furnaces or kilns, and to regulate or control either manually or automatically physical conditions at the controlled points.

Various control systems and apparatus have heretofore been proposed for operations of the character mentioned, but the prior systems have been more or less inaccurate in operation, complicated in structure, lacking in durability, and easily disarranged. One well known type of prior system is provided with a control galvanometer operated by currents produced by variations in conditions at the controlled point or points. Periodically operating mechanical means are provided which pushes the galvanometer pointer out of its normal plane of movement to actuate a control member. The movement required for dislocation of the pointer from its normal plane of movement and to actuate the control member introduces undue strains in the galvanometer and sufficiently heavy constructions must be utilized to withstand such strains. As a result the galvanometer cannot be made sufficiently sensitive in practical operation of such systems to eliminate the effect of the line resistance on the galvanometer. Appreciable errors are accordingly introduced in such arrangements by the effect of line resistance thereon. Furthermore, during the period of actuation of the control member the galvanometer pointer is held against movement so that for a substantial period the galvanometer is prevented from assuming a new position in accordance with changes in physical condition. A primary object of the present invention is to provide a contacting galvanometer mechanism in which the use of a sufficiently sensitive galvanometer is permitted to avoid appreciable errors due to the effect of line resistance and to reduce to a minimum the time in which movement of the galvanometer pointer is prevented. This is accomplished by providing contacting mechanisms in which a light trip mechanism is released by pressing the galvanometer pointer against the fixed stop arranged very close to the pointer so that the pointer is not pushed appreciably away from its normal plane of action to effect the tripping operation, and is freed for movement as soon as the tripping action is effected. By this arrangement substantial deflection of the galvanometer pointer away from its normal plane of operation is avoided, eliminating the strains on the bearings and suspensions and permitting the use of a very sensitive galvanometer which will function substantially independent of the line resistance of the galvanometer control circuit.

A further disadvantage of prior contacting galvanometer recording and control instruments of the type mentioned is that the smallest adjusting step which may in practice be made is approximately one-thirty second of an inch, and this adjustment is caused by a movement of a vertical adjustment of the control member of a few thousandths of an inch so that small adjustments are inaccurately made, difficult to produce, and unstable in operation. Another object of the present invention is to provide a control mechanism in which a substantially smaller ratio of length of adjusting steps to the vertical movement of the control members is attained so that much finer adjustments of the mechanism may be made and a more stable mechanism is provided.

The prior proposed mechanisms of the character mentioned have been of a complicated nature difficult to properly time and costly to manufacture. A further object of the invention is to provide a simplified mechanical control mechanism of the character in which the mechanisms are all timed in operation from a single cam or element which may be accurately reproduced in large quantities by stamping or similar low cost operations so that instruments of a high and uniform degree of precision may be manufactured at relatively low cost and in large quantities, without the necessity for utilizing highly skilled labor in adjusting and regulating the timing of the various related mechanisms entering into the combination as a whole.

Another object of the invention is to provide a novel control mechanism of the character mentioned in which novel combinations of mechanically operated switching mechanisms are provided; and in which recording and switching mechanisms are mechanically actuated under the mechanical control of a galvanometer by a single drive motor rotating continuously in the same direction.

Other objects of the invention are to provide a novel selective control switching arrangement for effecting the various control operations; to provide novel signalling methods and apparatus for indicating the position of the direction and degree of deviations from normal to an attendant; to provide novel switching methods and apparatus for connecting a common control mechanism successively to the plurality of circuits in which a maximum predetermined time is allotted to each circuit, and in which the switching mechanism is advanced as soon as normal conditions are established on a circuit at any time prior to the expiration of the maximum time allotted to the circuit whereby each circuit is seized only until the conditions controlled on the seized circuit are restored to normal; and to provide novel methods and apparatus for making distinguishable records on a common record sheet of a plurality of controlled conditions.

Further objects of the invention will appear in the following detailed disclosure of preferred embodiments thereof and are such as may be attained by a utilization of the various principles, steps, combinations, and subcombinations hereinafter set forth and as defined by the terms of the appended claims.

As shown in the drawings,

Figure 1 is a front elevation with parts broken away showing a preferred embodiment of my invention.

Figure 2 is a side elevation with parts broken away of the form of invention shown in Figure 1.

Figure 3 is a plan view with parts broken away of the form of invention shown in Figure 1.

Figure 4 is a fragmental plan view showing in detail the contacting and actuating mechanism of the form of invention shown in Figure 1.

Figure 5 is a fragmental perspective view showing a preferred embodiment of trip control mechanism.

Figure 6 is a detailed sectional view showing the operating arm for the contacting table.

Figures 7, 8 and 9 are detailed views showing a toggle member for the trip release in the preferred embodiment of the invention.

Figure 10 is a graphic representation of the movement of the pawl arms, secured by the linkage in the preferred embodiment of the invention.

Figures 11 and 12 are fragmental front elevation and plan views respectively of the paper feed mechanism for the preferred form of invention.

Figure 13 is a front elevation partially in section showing a preferred form of selective control switch for use with the invention.

Figure 14 is a plan view in section through the line A—A of Figure 13.

Figure 15 is a detailed view showing the control disc for the selecting switch mechanism.

Figure 16 is a detailed view showing a locking mechanism used in the preferred form selecting switch.

Figure 17 is a fragmental view showing a printing hammer control arrangement, utilized in the preferred embodiment of the invention.

Figure 18 is a detailed fragmental perspective view showing the operating mechanism for a multi-point circuit control switch utilized with the invention.

Figure 18—A is a detail perspective view showing a modification of the mechanism shown in Figure 18.

Figure 19 is a perspective view showing a multi-point control switch arrangement and ribbon color control mechanism for the preferred embodiment of my invention.

Figure 20 is a detailed view of the ratchet control mechanism for the multi-point switching mechanism.

Figure 21 is a front elevation partially in section showing the multi-point control switch.

Figure 22 is a perspective view showing the ribbon carrying and control mechanism utilized in the preferred embodiment of my invention.

Figure 23 is a plan view showing the essential details of a modified contacting galvanometer and control arrangement.

Figure 24 is a front elevation of the form of invention shown in Figure 23.

Figure 25 is a fragmental plan view showing a further modification of the contacting and adjusting mechanism.

Figure 26 is a front elevation partially in section of the form of invention shown in Figure 25.

Figure 27 is a side elevation with parts omitted, and partially in section of the form of invention shown in Figure 25.

Figure 28 is a circuit diagram showing a method of connecting the apparatus electrically.

As shown in Figures 1, 2 and 3, casing and supporting section 1 is provided which may be secured to a supporting wall or instrument panel by means of the lugs 2. Formed adjacent the forward edge of the lower side of casing section 1 are the hinge projections 3 to which the hinge projections 4 of the forward casing section 5 are pivotally secured by means of suitable pivot pins 6. The casing section 5 is provided with a glass front panel 7 and may be provided with glass sides and top panels if desired. A suitable catch or locking member 8 is mounted adjacent the forward edge of the top of casing section 1 for locking the sections 1 and 5 in closed position. When access to the mechanism is desired, the locking device 8 may be released and the front section 5 of the casing may be swung downward about the hinge pins 6. Secured in the lower part of the casing section 1 is a metallic strip 9 curved to form a saddle or seat (Figure 2) in which dry cells 10 may be supported. Formed integrally with the rear and an end wall of the casing section 1 are the projecting hinge lugs 11 on which the hinge projections 12 of a housing and supporting casting 13 are pivotally secured by means of the hinge pins 14. When the front section 5 of the outer casing is dropped, the housing section 13 may be swung forward giving access to a compartment 15 in which the sensitive control galvanometer 16 of any suitable type is supported. A cover plate 17 for compartment 15 is secured in position by the screws 18. The cover plate 17 stops short of the upper forward edge of compartment 15 leaving a slot 19 through which the pointer 20 of the galvanometer 16 extends and is free to swing in a horizontal plane in an auxiliary casing 21 provided with metal sides (Figures 1, 2, 3 and 4) and removable celluloid or glass top and front pieces 22 and 23 and removable metallic bottom piece 24 slidably held in position so that the mechanism in the casing 21 will be completely enclosed but visible and readily accessible. Supported in the metallic side of casing 21 are the fixed stop rods 25 and 26. Rod 25 is positioned adjacent and just above the end of the pointer 20, and acts as a stop for limiting upward tilting movement of the pointer. Rod 26 is positioned to act as a restoring member for trip members 27 and 28 of the control mechanism to said position as will more fully hereinafter appear. Trip members 27 and 28 (Figure 5) are provided at their outer ends with the upstanding contacting pieces 29 and 30 which in turn are provided with the inclined contacting edges 31 and 32. Trip members 27 and 28 are pivotally supported by means of the two pins 33 from extensions or ears 34 of parts 35—a and 35—b of the contacting table structure 35. Contacting table 35 is provided with the supporting extensions 36 and 37. Extension 36 is secured to a rod 38 by means of pin 39. Rod 38 extends through and is journaled adjacent extension 36 in the side wall of section 40 of the housing 13, and passes through a sleeve 41 (Figure 6) to which it is journaled in and extends through the opposite side wall of section 40 and also passes through and supports the extension 37 of table 35. A pin 42 passing through the extension 37, sleeve 41, and rod 38 secures these elements together so that as arm 43 formed integrally with sleeve 41 is actuated, rod 38, together with the table 35 will be rocked or oscillated about rod 38 as an axis. The lower end of actuating arm 43 is engaged by extension 44 of a bell crank 45 (Figures 3 and 4) disposed in a gear compartment 46 formed in housing 13. Bell crank 45 is pivotally supported from the upper wall of the compartment 46 by means of the pivot pin 47. A pin 48 secured to the end of member 45 bears against the surface 49 of a cam member 50 which is journaled for rotation in the compartment 46. Cam 50 is driven by means of gear 51 which in turn is driven through the train of spur gears 52, 53, and 54, and the worm wheel 55 journaled in compartment 46. Worm wheel 55 is driven by worm shaft 56 of the electrical drive motor 57 which is suitably supported from the housing 13. Motor 57 is preferably a salient pole induction motor which drives the cam 50 at a uniform rate timed by the speed regulating devices of the alternating current supply source and eliminating the necessity for local speed regulating devices. Rotation of cam 50 causes bell crank 45 to oscillate about its pivot 47, and arm 44 thereof actuates the arm 43 of the contacting table 35 causing vertical oscillation of the table about the axis of rod 38 as an axis, the weight of the contacting table and the connected parts being sufficient to hold the pin 48 of arm 45 against a cam surface 49 of the cam 50 in operation of the device.

Formed integrally with the trip members 27 and 28 are rear extensions 58 and 59 which are preferably inclined upwardly at a slight angle and to the under sides of which toggle members 60 are secured by rivets 61 or in any other suitable manner. Toggle members 60 are of spring steel, the body portions of which normally incline away from extensions 58 and 59 and which are provided with the projections 62. Projections 62 in unactuated position of trip members 27 and 28 engage and hold the spring members 63 and 64 in stressed position to the left in Figure 5. Springs 63 and 64 are secured to projections 65 of the table 35. Adjusting screw 66' threaded in extension 67' of the table 35 engage extension 68 of the parts 35—a and 35—b and are provided to effect a lateral adjustment of the space between contacting members 29 and 30 which determines the clearance allowed at the normal or zero position for the galvanometer needle 20. Screws 68'-threaded into extensions 68 and the ends of which abut against suitable projections of table structure 35 provide means for effecting vertical adjustments of the contacting members.

In operation of the trip mechanism, contacting members 29 and 30 are adjusted so that in the normal or zero position of the galvanometer pointer 20, the end of the pointer will pass between the trip members 29 and 30 without being engaged by the inclined surfaces 31 or 32 thereof, as the table 35 is raised by the action of the cam 50. When the galvanometer pointer is shifted from normal position over the space between contacting members 29 and 30, as the table 35 moves upward, surface 31 or 32, depending upon the direction of deflection of the galvanometer pointer, will come into contact with the pointer forcing it upward slightly against the fixed stop rod 25. When the pointer engages rod 25, further upward movement of the table will cause rotation of the corresponding trip member 27 or 28 in a clockwise direction in Figure 5 about the pivot pin 33. This movement of the member 27 or 28 causes an upward movement of the corresponding extensions 58 or 59, breaking the corresponding toggle lock between the corresponding toggle member 60 and the spring 63 or 64, freeing spring 63 or 64 for forward movement by its own tension. The weight of the forward sections of trip members 27 and 28 is slightly greater than the rear sections. Breaking of the toggle locks permits the overbalance in weight of the forward sections of trip members 27 or 28 to become effective with the result that the forward end of the released or actuated member 27 or 28 will tilt downward, freeing engaged pointer 20 immediately. Due to the inclination of edges 31 and 32, the point in upward movement of the table 35 at which the toggle locks will be broken freeing the spring 63 or 64 for forward movement will depend upon the amount of deflection of the galvanometer needle 20 from its normal position. As table 35 approaches the end of its downward movement, the released trip member 27 or 28 will engage rod 26 and as downward movement of the table 35 continues the released trip member will be rotated counter-clockwise about one of the pivot pins 33. This rotation of the trip member brings the toggle members 60 into engagement with the upper edges of springs 63 or 64 and as the movement continues, the toggle members 60 will be forced towards the extensions 58 and 59 causing movement of the shoulders 62 to the left in Figure 5 as the toggle members straighten out. Shoulders 62 by this movement are brought into engagement with freed spring 63 or 64 and force the released spring toward the left in Figure 5, placing it under tension. The proportioning and arrangement of parts is such that as the table 35 reaches the end of its downward movement, the line of pressure of the springs 63 and 64 against the shoulders 62 will tend to continue the rotation of the members 27 and 28 in a counter-clockwise direction about the pivot pins 33, and will lock the parts overcoming the tendency for the members 27 and 28 to tilt about pivots 33 in a clockwise direction due to the overbalance in weight of the front sections of the trip members and locking the parts in the unactuated position shown in Figure 5.

It will be seen that a sensitive galvanometer contacting mechanism is provided which is variably tripped in accordance with the amount of deflection of a control galvanometer, and which may be utilized to operate various control mechanisms. The trip action mechanisms are light so that very little stress is exerted thereby on the galvanometer pointer and a much more sensitive galvanometer may be used than has heretofore been permissible in contacting galvanometer control mechanisms. Accordingly, my improved control arrangement is substantially free from the effect of line resistance, giving a highly useful and novel result not heretofore attained in potentiometer recorders.

In the preferred embodiment of my invention, my improved contacting galvanometer mechanism heretofore described is utilized to mechanically control power mechanisms for the performance of various control and recording functions. As shown particularly in Figures 4 and 5, the springs 63 and 64 are connected to the rear ends of and actuate rods 66 and 67 which are connected at their forward ends to and actuate driving pawls 68 for the knurled or finely toothed driving disks 69 and 70. The connection of the rods 66 and 67 to the pawls 68 is substantially in alignment with the axis of rotation of disks 69 and 70 which are secured to and drive the spindles 71 and 72 in turn journaled in and extending through compartment 46 of housing 13. A cover plate 73 for the compartment 46 through which spindles 71 and 72 extend is secured in position over opening 74 by means of the screws 75 closing compartment 46 so that it may be packed with grease. The outer ends of the pawls 68 are pivotally secured by means of the screws 76 to the ends of the arms 77 and 78 which are journaled for rotation on the spindles 71 and 72 and are interposed between disks 69 and 70 and the cover plate 73. Secured to sleeve extensions 79 and 80 of the arms 77 and 78 and positioned in the compartment 46 are actuating arms 81 and 82. Arms 81 and 82 are provided with the extensions 83 and 84 to which the ends of the link 85 are pivotally connected by means of the pins 86. An actuating link 87 (Figures 3 and 4) is connected at one end to the outer end of arm 81 by means of the pin 88 and at its other end is connected by means of the pin 89 to the driving cam 50. In operation of the device, as cam 50 rotates an oscillating motion about the spindle 71 as a center is imparted to the arm 81. This motion is transmitted through the link 85 to the arm 82 so that the arms 81 and 82 together with the connected arms 77 and 78 are oscillated continuously through a path and with a variable motion passing through a period or cycle of movement for each revolution of the cam 50. With the arrangement of the linkage and spacing of the centers of the cam 50 and of the spindles 71 and 72, the movement of the ends of the arms 77 and 78 is graphically represented in Figure 10 by a curve A, utilizing the angular displacements of the arm 77 and of the cam 50 as the coordinates. By referring to this curve it will be seen that beginning with a dead center of motion at zero, the movement toward the opposite dead center of movement is relatively and increasingly slow and requires the greater portion of a revolution of cam 50 while the return movement is effected in a relatively shorter time giving a quick return movement to zero.

In operation, when member 27 or 28 is released or tripped by engagement of inclined edge 31 or 32 with the galvanometer pointer 20 the release of spring 63 or 64 and the corresponding forward movement thereof shifts the rod 66 or 67 throwing the corresponding pawl 68 about its pivot 76 and causing the point or driving projection 90 of the pawl to shift into engagement with one of the teeth of the disks 69 or 70. When a projection 90 engages a tooth of its associated disk, a driving connection will be established between the oscillating arms 77 or 78 during the clockwise movement thereof in Figure 4. The parts are proportioned and arranged so that when the movement of the arms 77 and 78 in a clockwise direction commences, the table 35 will be raised by cam surface 49 to a position where the tripping of member 27 or 28 can occur with a maximum deflection of the galvanometer needle 20 in either direction from its normal or zero position and the lowering of the table 35 occurs quickly as pin 48 of arm 45 slides down the steep part of the cam surface 49 during the pause of the arms 77 and 78 at the dead center position as shown by the flat part of curve A, (Figure 10) at the 270 degree point, locking pawl tips go out of engagement with the teeth of discs 69 or 70 before the quick return movement of arms 77 and 78 takes place. When no deflection of the galvanometer pointer occurs, neither of the discs 69 or 70 will be rotated. When, however, the galvanometer is deflected from its normal position, spring 63 or 64 will be released establishing a driving connection between the arms 77 or 78 and the disc 69 or 70 and the disc will be rotated an amount which will vary in magnitude with the magnitude of deflection of the pointer 20 from zero or normal position.

Spindles 71 and 72 extend through the bottom of compartment 46, and secured to the lower ends thereof are the driving pulleys 91 and 92 respectively, around which the endless belt 93 is looped. Belt 93 is preferably a metallic band and passes around the end pulleys 94 supported in brackets 95 from the casting 13 and around an idler or tension adjusting pulley 96 which is supported in a slot 97 of the bracket 95 and may be adjusted in the slot by means of the thumb nut 98. Rotation of disc 69 and spindle 71 moves the front leg of belt 93 to the left, while rotation of the spindle 72 moves the front leg of the belt to the right in Figures 1 and 3. Secured to the front leg of belt 93 is a carrier 99 for a suitable siphon recording pen or printing hammer. In the form of the invention shown, a printing hammer 100 is pivotally supported to the ears 101 projecting from the carrier 99. Secured to the projections 102 of the carrier member 99 and insulated therefrom is the sliding contact member 103, the ends of which contact with the resistance elements 104 and 105 comprising rods wound with resistance wire and supported in the projections 106 of housing 13. The resistances 104 and 105 may be connected in a potentiometer recorder circuit of any well known type controlling the galvanometer 16. One form of potentiometer circuit which may be utilized in connection with the mechanism so far described is shown in my copending application Serial No. 701,829 filed March 25, 1924. The movements of the belt 93 are recorded on a record sheet 107. The record sheet is wound on a roller 108 supported in the bearings 109 of side plates 110 which are fastened to the housing 13. The sheet of paper 107 is passed upward over a roller 111 mounted on the shaft 112 journalled in side plates 110, and is wound on a roller 113 supported on the shaft 114 which is also journaled in the side plates 110. Shaft 112 may be driven at a uniform rate by any well known type of driving mechanism from the motor 57. Mounted on the shaft 112 is a grooved pulley 115 which drives a belt 116, preferably made up of helical wire spring. Belt 116 passes over and drives a grooved pulley 117 secured to and driving the lower paper roll shaft 114.

In the preferred embodiment of the invention, the shaft 112 is driven by the stepping mechanism shown in Figures 11 and 12. In this form of drive, a worm wheel 119 secured to and driving shaft 112 meshes with a worm gear 120 formed integrally with a shaft 121. Shaft 121 is journaled in a bracket 122 which is secured to the inner side of a frame side member 110. Secured to the outer end of the shaft 121 is a toothed ratchet wheel 123 which is actuated by a pawl 124 pivotally mounted by means of pin 125 on the end of an actuating arm 126. Arm 126 is journaled on the shaft 121 between the side of bracket 122 and the ratchet wheel 123, and the outer end thereof which is of sufficient weight to tilt the parts counter-clockwise in Figure 11, is disposed above an actuating arm 127. Arm 127 may be rocked vertically by any suitable mechanism actuated from the motor 57 and imparts an oscillating movement to the arm 126. Formed in the side of the brackets 122 adjacent the pawl 124 are the spaced threaded holes 128 in which a pin 129 may be screwed. In operation of the drive mechanism, the weight of the outward extension of arm 126 will throw the pawl 124 upward until movement is arrested by the pin 129. On the upward movement of the arm 127, the outer end of the arm 126 will be engaged by the actuating member 127 and the pawl 124 will be thrown downward, engaging a tooth of the ratchet wheel 123 and rotating the ratchet wheel together with the shaft 121, gear 119, driving shaft 112, and the paper roll. By changing the position of the pin 129 the amount of throw of the pawl 124 can be varied and accordingly the speed of the paper feed may be changed. A standard paper feed mechanism may accordingly be utilized for various instruments, and the speed may be varied by shifting the location of pin 129 to meet the particular requirement of the instrument in which the driving mechanism is to be utilized. When a siphon pen is carried by the belt 93, an ink record of the belt movements under control of the contacting galvanometer mechanism will be made on sheet 107.

In addition to the function of recording, it is frequently desirable that various control functions be performed by the mechanism heretofore described. In Figures 13, 14 and 15 a novel switching mechanism is disclosed which, while especially adapted for use with the mechanism so far described is useful with other types of recording and control mechanisms. When this control mechanism is utilized in connection with the improved form of recorder heretofore described as shown in Figure 13, the pulley 94 is formed integrally with a spindle 130 which extends vertically upward and is journaled in a suitable extension 131 of the housing section 13. Adjustably secured to the upper end of the spindle 130 by means of the thumb nut 132 is a control disk 133. Control disk 133 is rotatable with spindle 130 and in operation of the device is driven by the belt 93 of the recorder through pulley 94. Formed in control disk 133 (Figure 15) are the control surfaces and notches 134, 135 and 136. Journaled on spindle 130 is a lock out member 137 which is provided with a recess 138 and has secured thereto a spur gear 139. Spur gear 139 rotates the lock out member 137 about the spindle 130 as an axis, and in turn meshes with and is driven by a mutilated pinion 140 rotatably supported on a standard 141 from the casting 13. Mutilated gear 140 is of the type usually used in ordinary counting devices and is actuated by projections 142 formed on the disk 133 to rotate the gear 139 and the lock out teeth 137 in a manner and for a purpose that will more fully hereinafter appear. With belt 93 holding the pen or printing hammer 100 in a position corresponding to the normal condition, the notches or surfaces 134 and 135 of the disk 133 will be positioned above control extensions 143, 144 and 145 respectively of cross bars 146, 147 and 148. Secured to cross bars 146, 147 and 148 are the upstanding lock out projections 149, 150 and 151 which co-act with the lock out member 137, as will more fully hereinafter appear. The cross bars 146, 147 and 148 are connected by means of the arms 152, 153 and 154 to and movable with the members 155, 156 and 157 which are pivoted on a rod 158 the outer ends of which are supported on the upper ends of the oscillating frame side members 159 and 160. The frame members 159 and 160 are joined by a cross piece 161 and are journaled for rotation on a shaft 162 which is supported from a bracket or casting 163. Frame member 163 is secured to the casting 13. The lower end of the frame member 160 is pivotally connected to one end of the link 164 by means of a pin 165. The opposite end of link 164 is connected to the free end of arm 166 by means of pin 167 (Figure 3). Arm 166 and link 164 are disposed under compartment 46 of housing 13 and arm 166 is secured to a spindle 168 (Figures 1 and 3) which is journaled in the housing 13 and extends into the compartment 46. Secured to the spindle 168 in the compartment 46 is an arm 169 which is engaged and actuated by a pin 170 secured to the driving cam 50.

Formed integrally with the pivoted members 155, 156 and 157 are the switch operating plungers 171, 172 and 173 (Figure 14) respectively. Secured to each of the plungers 171, 172 and 173 and normally held in engagement with frame cross member 161 by means of springs 174, are the stop members 175. Formed in the ends of the switch operating plungers are operating shoulders 176 which in certain positions of the plungers as will more fully hereinafter appear, are adapted to engage the ends of arms 177 of switch actuating bell cranks pivotally supported by rod 179 from bracket 163 and positioned between the supporting side extensions 180 of the contact carrying members 181, 182 and 183. The lower ends of side members 180 are pivotally supported on rod 179, and springs 184 connected between the shaft 162 and members 181, 182 and 183 to normally urge the contact carrying arms clockwise in Figure 13 about the pivot rod 179 until the stop and actuating extensions 185 engage the bottom of bracket 163. Secured to extensions 185 of the contact carrying arms are actuating extensions 186 which are connected to bell crank arms 177 by means of links 187. Formed on locking arms 188 of the switch actuating bell cranks are cam surfaces 189. Resting against cam surfaces 189 of arms 188 individual to members 181 and 183 are latching members 190. Latching members 190 are rigidly secured to spindle 191 which is journaled in the supporting frame work 163. Members 190 move together and due to their weight are held in engagement against locking arms 188. A latching member 192 (Figure 16) is pivotally supported on the rod 191 and provided with the upwardly extending actuating arm 193 and having lateral extension 194 is provided for the actuating bell crank member of the central contact carrying member 182. Formed on the forward end of plunger 172 is an extension 195 which is adapted to engage the lateral extension 194 of the locking member 192 in operation of the device as will more fully hereinafter appear.

Pivotally supported on the upper end of the arms 181, 182 and 183 are the electrical contacts 196, 197 and 198 which are adapted to complete electrical circuits between the common contact 199, and contacts 200, 201 and 202, which are supported upon and suitably insulated from the bracket member 163, and are provided with the binding posts 203 to 206 respectively for the connection of suitable conductors thereto.

In operation of the switching mechanism shown in Figures 13 to 16, link 164 is actuated to oscillate the frame comprising the members 159, 160 and the parts carried thereby about the shaft 162 from the position shown in Figure 13, in a counter clockwise direction and returning to the normal position as shown. This movement of the frame shifts the shaft 158 together with the switch operating plungers 171, 172 and 173, and the control members 143, 144 and 145 individual thereto, to the left in Figure 13. As the movement of the frame and shaft 158 to the left proceeds the control members 143, 144 and 145 will swing upward engaging the surfaces 134, 135 or 136 of control disk 133. The control members 143 and 145 then slide along the engaged surfaces of disk 133 which will determine the elevation of the forward ends of the switch actuating plungers 171, 172 and 173 during the remainder of the forward movement of the plungers. When member 143 or 145 engages surface 136, the forward ends thereof will be above the ends of the bell crank arms 177 as the movement of the parts to the left in Figure 13 is completed and no effect will be produced. When control extension 143 or 145 engages a surface 135 of the disk during the movement of parts to the left in Figure 13, the shoulders 176 of the plunger 171 or 173 controlled thereby will engage the upper end of the corresponding arm 177 and will shift the arm 177 to the left causing the actuated cam surface 189 to force both latches 190 counter-clockwise in Figure 13 a sufficient amount to free the locked one of the bell crank arms 188 in event contact 196 or 198 has been previously closed. If control member 143 or 145 engages surface 134, the outer end of the plungers 171 or 173 will be depressed a sufficient amount to cause the end thereof to engage the corresponding arm 177 and in this case the corresponding arm 177, together with arm 188 individual thereto will first actuate the latches 190 to release the contact controlled by the other arm 177 and the movement of the actuated arm 177 will then continue until the corresponding contact 196 or 198 is closed with its actuating extension 186 stressed and the corresponding latch 190 drops over the end of arm 188 of the contacting carrying member 181 or 183 locking the contact 196 or 198 firmly in closed position due to the stressing of the extension 186. Upon the restoration of parts to the position shown in Figure 13 the actuated one of the contacts 196 or 198 will be locked in closed position until freed by closing of the other of the contacts or by engagement of the control members 143 or 145 with the surface 135 of disk 133. Accordingly, only one of the contacts 196 or 198 may be closed at a given time.

The contacts 196 and 198 may control electric circuits for suitable control mechanisms or signalling devices. When used to perform automatic recording and control functions these contacts may be used to regulate sources of energy to restore the conditions at the controlled point or points to the normal value in well known manner. In practice the spacing of the control members 143 and 145 and relation of notches in disk 133 is preferably such that each control member may rest on surfaces 135 of the disk 133 at the same time, but only one thereof can engage surface 134 or 136 at a time. The width of surface 134 is preferably such that the largest step taken by belt 93 and disk 133 from normal position cannot carry this surface entirely past control members 143 or 145 so that for any substantial deviation from normal appropriate correcting or warning switching operations must occur. The relation of the disk 133 to the remainder of the mechanism is such that with surfaces 135 over control members 143 and 145, pen or printing hammer 100 is positioned to indicate on record sheet 100 the existence of the normal condition which it is desired to maintain by the control mechanism. When a deviation from the normal condition occurs galvanometer pointer 20 is deflected tripping spring 63 or 64 causing engagement of the corresponding pawl 68 to effect rotation of disk 69 or 70 to shift belt 93 and the pen or printing hammer 100 from its normal position an amount depending upon the magnitude of the deflection of the galvanometer pointer from normal as above set forth. The movement of the belt 93 is transmitted through pulley 94 to the disk 133 and causes the surface 134 to be positioned over the control member 143 or 145 in accordance with the direction of deflection of the galvanometer needle and the direction of movement of the pen or printing hammer from normal. After the movement of the disk 69 or 70 and the belt 93 has been completed, the pin 170 of cam 50 engages the arm 169 rocking the frame member 160, shaft 158, and the parts carried thereby to the left in Figure 13 causing the closing of one or the other of the contacts 196 or 198 in accordance with the direction of deviation from the normal position. At the end of a complete revolution of the cam 50 the switch controlling parts will be restored to the position shown in Figures 3 and 13 with the switch actuating plungers positioned to the right in Figure 13. Contact 196 or 198 will remain locked in closed position until restored in a succeeding cycle of operation when the controlled condition is restored to normal. The closure of contacts 196 and 198 sets into operation the mechanism which controls the restoration toward normal of the conditions controlled by the potentiometer. Mechanisms of this type are well known in the art and may for example be such as are disclosed in my above mentioned copending application the electrical circuit for which is shown diagrammatically in Figure 28. The thermocouple 171' responsive to temperature variations in the furnace 172' is electrically connected with the controller which is here diagrammatically illustrated. Operation of the controller in the manner described in detail above controls the contacts 196 and 198 and closes a circuit through the motor 178' either over conductor 173' or 174' respectively, the circuit for the motor being located over the power line 175'. Operation of the motor 172' in the manner described above rotates its shaft to vary the valve 176' in the fuel supply line 177'. This well known arrangement diagrammatically illustrated is of course one particular application of the control mechanism mentioned above although it will be understood that the control may be applied in many other manners referred to above.

For temperature or other control operations the switch contacts 196 and 198 only need be provided. However, it is frequently desirable to operate a signaling system in connection with the automatic control mechanism, or to eliminate the automatic controls entirely and to indicate to an attendant manual control operations necessary for the maintenance of normal conditions at a controlled point or points. For this purpose contact 197 together with the plunger 172 and the related parts are utilized. In operation, during normal conditions, the control members 144 will engage the surface 134 as the shaft 158 is shifted to the left in Figure 13 and the forward end of extension 195 (Figure 16) of the plunger 172 will be lowered so that it will pass under the lateral extension 194 of the locking member 192, and the shoulder 176 of the plunger 172 will engage the upper end of the actuating bell crank arm 177 for the contact carrying member 182, first actuating cam surface 189 to force latch 192 counterclockwise about the pivot 191, and then closing contact 197 and permitting the latch 192 to drop over the end of the arm 188 to lock contact 197 closed. When a slight deviation from normal conditions occurs disk 133 is rotated so that one of the control members 144 engages surface 135 of the disk 133 as the plungers 171 to 173 move to the left in Figure 13. Under these conditions the elevation of plunger 172 will be such that the shoulder 176 thereof will engage the upper end of the arm 177 again closing the contact 197 and the end of extension 195 will engage the lateral extension 194 of latch 192 preventing movement of the latch 192 over the end of the locking arm 188 for the contact carrying member 182. Accordingly during slight deviations from normal conditions, contact 197 will close during the movement of the plungers to the left and will open when the switch operating plungers move to the right and thus be restored to the position shown in Figure 13. For further deviations from normal, one of the control members 144 will engage the surface 136 of the disk 133 and the end 195 of the switch actuating plunger 172 will then be so positioned in the movement thereof to the left in Figures 13 and 16, that its end will engage the lateral extension 194 rocking latch 192 to release the locking arm 188 together with the contact carrying arm 182 permitting the contact to open in event it has been closed and surface 176 will pass above the end of arm 177 individual to contact 197 so that contact 197 will remain open. Signal lamps or devices may be connected to contacts 196, 197 and 198 in any suitable manner.

The distance between the outer edges of the control members 144 may be made less than the width of the surface 134, so that the contact 197 may close over a narrow range of conditions in the vicinity of the desired normal value operating the light or signal controlled thereby, while one of the other lights operated by the contacts 196 and 198 may be burning. The width of the recesses formed by the surface 135 may also be made such that either the control member 143 or 145 will engage surface 134 while the other engages surface 135 with the result that the light or signal corresponding to the control member 143 or 145 engaging the surface 134 will be operated whenever the switch control plungers move to the left in Figure 13, but will not be allowed to remain closed due to the operation of the opposite switch operating plunger 171 or 173 as the case may be in raising latches 190 and preventing the locking arm 188 of the switch member 181 or 183 in closed position. The exact operation of the signaling mechanism will depend upon the spacing of the control members 143, 144 and 145 with respect to the width of the notches or steps forming the surfaces 134 and 135 in the control disk 133 and various combinations of signals may be provided; for example, using red, white, and green light controlled by contacts 196, 197 and 198 respectively and by suitable spacing the following signaling operations may be accomplished in temperature control systems:

| Temperature | Light |
|---|---|
| Very high | Red continuous. |
| Slightly high | Red and white continuous. |
| Normal | White continuous. |
| Slightly low | Green and white continuous. |
| Very low | Green alone continuous. | or by different proportioning

| Temperature | Light |
|---|---|
| 20 degrees or more high | Red continuous. |
| 15 degrees high | Red continuous, white flash. |
| 10 degrees high | Red continuous, white continuous. |
| 5 degrees high | Red flash, white continuous. |
| Normal | White continuous. |
| 5 degrees low | Green flash, white continuous. |
| 10 degrees low | Green continuous, white continuous. |
| 15 degrees low | Green continuous, white flash. |
| 20 degrees or more low | Green continuous. |

For convenience in construction and accuracy of operation the circumference of the pulley 94 for the belt 93 is preferably about one-third of the total distance of travel of the recorder pen or printing hammer 100. Accordingly, this pulley turns through three revolutions when the pen or hammer travels across the full scale of the recorder. Operation of the switch contacts 196, 197 and 198 is, however, prevented by the disk 137 when the surfaces 134 and 135 are disposed above the control members 143, 144 and 145 with the recording pen or printing hammer shifted away from the normal position, and false operation is prevented. Lock out disk 137 is so connected to the disk 133 through counting gears 139 and 140 that when the recording pen or printing hammer is in normal position, the recess 138 formed in the lock out member 137 will be positioned directly above the lock out projections 149, 150 and 151 of the cross members 146, 147 and 148, carrying the control members 143, 144 and 145 for the switch actuating plungers. As a deviation from normal sufficient to cause a complete revolution of the disk 133 occurs, the counting mechanism drive for the lock out member 137 becomes effective and towards the end of a complete revolution the lock out disk 137 is rotated to shift the cut out portion 138 thereof from above the projections 149, 150 and 151 with the result that when the plungers 171, 172 and 173 are shifted to the left in Figure 16, they are held in raised position above the ends of arms 177 and operation of the switches is prevented. Further movement of the pen away from normal results in a further displacement of the cut out portion 138 from above the lock out projections and until the pen or hammer 100 returns to its proper operating zone, and disk 137 is restored to normal position, operation of the contacts 196, 197 and 198 is prevented. To prevent interference between the switching and adjusting mechanisms, pin 170 is so placed in cam 50 that the switch actuating frame work is held in the position shown in Figure 13 with the control members 143, 144 and 145 out of engagement with the control disk 133 during the operating stroke of driving pawls 68. The plungers 171, 172 and 173 accordingly complete their forward and backward strokes during the return movement of the driving pawls for the disks 69 and 70 when the disks 69 and 70 and the belt 93 are stationary. Certain novel features of the actuating mechanism illustrated in Figs. 13–16 thereof and illustrated in a somewhat different form in my copending application Serial No. 581,932, filed December 18, 1931, are not claimed herein but are claimed in the last mentioned application.

Where only one condition is to be recorded by the mechanism a siphon recording pen or a printing arrangement may be utilized. As shown in Figure 17, the printing hammer 100 is provided with an actuating extension 211 having a recess 212 and a shoulder 213. Shoulder 213 is engaged by projecting ribs or teeth 214 of an actuating member 215 which is journaled for rotation in the extensions 106 of the casting 13. To effect a printing stroke of hammer 100, the member 215 is rotated a distance of one tooth for each printing impact and the tooth 214 thereof in engagement with projection 213 will first rotate the printing hammer 100 in a clockwise direction in Figure 17 until the end of the tooth passes out of engagement with the shoulder 213. The weight of the printing hammer will then become effective causing the hammer to rotate in a clockwise direction a sufficient amount to deliver a printing impact through ink ribbon 216 on the record sheet 107. After the printing impact has been delivered, the next tooth 214 of member 215 will engage the shoulder 213 and will rotate the printing hammer 100 to the position shown in Figure 17 in readiness for the next printing impact. Where a record of a single condition only is to be made, any suitable mechanism for advancing the member 215 one step or tooth on each downward movement of table 35 may be utilized.

When the contacting mechanism is utilized for multiple circuit recording and control purposes, ribbon 216 is multi-colored, and provision is made for causing the imprinting of different colors to denote the different conditions under control on the record sheet. In such cases a trip member 217 (Figures 4 and 5) is pivotally supported on the rod 33 of the contacting table 35 and is disposed directly above the trip member 27 with a projecting section thereof extending over a section of and adapted to be engaged by the trip member 28. Formed integrally with the trip member 217 is a catch projection 218 provided with the shoulder 219 which is adapted to hook over the end of an arm 220. Arm 220 is provided with a projection 221 engaged by the table 35 in the upward movement of the table and is secured to a rod 221' which at its inner end is journaled for rotation in a suitable extension 222' of the section 40 of casting 13. As shown in Figures 1 and 18, rods 38 and 221' extend to the left and have rigidly secured to the outer ends thereof the inner ends of links 222 and 223. Pivotally connected to the outer end of the link 222 by means of the pivot pin 224 is the upper end of link 225 which is pivotally connected to ratchet arm 226 by means of pin 227. Arm 226 is pivotally supported by means of pin 228 from the side plate 110. Pivotally connected to the opposite end of arm 226 by means of pin 229 is the pawl 230 provided with an actuating tooth 231 held in engagement with the teeth of ratchet wheel 232 by gravity or by a suitable spring not shown.

As shown in Figure 20 the ratchet wheel 232 is secured on a sleeve 233 which is journaled on a pin 234. Pin 234 is threaded into and supported from side plate 110 and rotatably supported on the pin is a sleeve 235 to which toothed ratchet wheel 236 is secured. Secured in the wheels 232 and 236 are pins 237 which are equally spaced and adapted to be brought into alignment with each other. As shown three pins 237 are provided in each wheel. A ratchet arm 238 is pivotally supported on pin 234 and pivoted to this arm by means of a pin 239 is the actuating pawl 240 which by its weight or a suitable spring is normally held in engagement with the teeth of the ratchet wheel 236. Ratchet arm 238, due to its weight, tends to rotate clockwise in Figure 17 until it engages a stop pin 241 secured in the side plate 110. Arm 238 is actuated by a pin 242 which is secured to and projects from the operating link 243. Operating link 243 is pivotally connected at its upper end by means of a pin 244 to the outer end of the arm 223. Formed in the lower end of the link 243 is a slot comprising a vertical section 245 and a lateral extension 246 into which a pin 247 secured to and projecting from a toggle arm 248 fits. Arm 248 is pivotally connected by means of the pin 249 to the side plates 110. Adjacent its outer end the arm 248 is pivotally connected by means of the pin 250 to a short toggle link 251 which at its other end is pivotally connected by means of the pin 252 to an actuating member 253. An extension 254 of the arm 248 is provided to limit the upward movement of the toggle connection. Actuating member 253 is pivotally supported on the end of a ribbon frame by spindle 254' which is journaled in a suitable projection 255 of the side plate 110. A flat spring 256 secured at one end to the actuating link 243 for the member 253 has its other end held in the path of movement of pins 237 and is arranged so that when the link 243 is moved to its upper position and a pin 237 of wheel 232 or wheel 236 is in engagement with the end of the spring 256, the spring is tensioned sufficiently to press the lower end of link 243 about its pivot pin 244 so that the lateral slot section 246 will be shifted over the pin 247. When the end of spring 256 is not engaged by a pin 237, arm 243 will be positioned as shown in Figure 18 with pin 247 in slot 245. As table 35 oscillates a vertical reciprocating motion is imparted to link 243, causing actuation of arm 238 and stepping of ratchet wheel 236. With pin 247 in slot section 246 downward movement of link 243 depresses toggle arm 248 and member 253 is rotated clockwise in Figure 18 about its pivot 254'.

Formed on the member 253 is an operating member 259, which is of sufficient width to fit into and is in alignment with the space between the ratchet wheels 232 and 236 (Figure 20) and is adapted to engage the pins 237 to shift the ratchet wheels 232 and 236 when member 253 is actuated for a purpose which will more fully hereinafter appear. Pivotally secured to an extension 260 of the member 253 by means of a pivot pin 261 is an actuating pawl member 262, the downward motion of which is limited by the stop pin 263. Pawl 262 is provided with a shoulder 264 adapted to hook over a tooth 214 of the printing hammer actuating member 215 (Figures 17 and 19) during each clockwise movement of the member 253 in Figure 18, and on the return or counterclockwise movement of the member 253 shoulder 264 rotates the member 215 a sufficient distance to effect a printing stroke of the printing hammer 100 as above set forth. Connected to an extension 265 of the member 253 is the end of a switch actuating rod 266 which at its opposite end is connected to actuating pawl arm 267 (Figure 19) of a multiple switching mechanism. The inner end of the pawl arm 267 is journaled on shaft 268 (Figures 19 and 21), which has pivotally secured thereto a ratchet pawl 269 which is adapted to engage the teeth of ratchet wheel 270. Ratchet wheel 270 together with an irregular star or control wheel 271 are rigidly secured to shaft 268 by means of a securing nut 272, held in position by a pin 273. Shaft 268 extends downward through and is journaled in a stationary casing member 274 (Figure 21) provided with a cylindrical extension 275' (Figure 21) on the lower part of which suitably insulated conducting rings 275 and 276, and the rings of insulated electrical contacts 277 and 278 are supported. Secured to the lower end of the shaft 268 and rotatable therewith is a contact carrying brush arm 279 to the extension 280 of which the contact brushes 281 and 282 are secured. Rotation of the shaft 268 through actuation of the pawl arm 267 rotates the brush arm 279 together with the brushes 281 and 282 step by step establishing electrical contact between the conducting rings 275, 276 and the switch points or segments 277 and 278 respectively. A protecting casing 283 is provided which may be filled with oil so that the switch contacts operate in oil. The entire switch assembly may be secured to the casing or housing 13 (Figures 1, 2 and 3) by means of the securing screws 284, with the casing section 283 extending downward through a suitable opening formed in the housing.

Irregular star wheel 271 is provided with control surfaces adapted to be engaged by the end of a stop projection 285 of a ribbon supporting frame 286 (Figures 2, 19 and 22) for the printing ribbon 216. The ribbon supporting framework 286 is formed integrally with the pivot member 254' for the actuating member 253, and is pivotally supported from the projections 255 of the side plates 110. Secured to and projecting from the side member of the frame 286 is an actuating pin 287 which extends into a slot 288 (Figure 18) of the actuating member 253. Inked ribbon 216 passes in front of the record sheet 107 and around the rollers 289' supported on the frame 286 between the ribbon spools 288 and 289 journaled on suitable spindles supported on the ends of the removable arms 290 which are secured to the frame 286. The spool 289 is provided with an upper driving gear flange 291 disposed adjacent shelf 292 which meshes with a pinion (not shown) secured to and driven by a spindle 293 extending through shelf 292. Spindle 293 is driven by a ratchet wheel 294. Pivotally supported on the spindle 293 is a pawl arm 295 to one end of which a pawl 296 is pivotally supported. The end of pawl 296 is held in engagement with the teeth of the ratchet 294 by means of the spring 297. Pawl arm 295 is actuated by a rod 298 secured to the other end thereof. Rod 298 is slidably supported in the frame 286 with the end thereof protruding to the rear so that each time the frame 286 is raised about its pivots 254', the end of the rod 298 will engage a projection of the casing section 1 and will actuate arm 295 to advance the ratchet wheel 294 a distance of one tooth, causing driving of the gear 291 and the advance of the ribbon 216.

In operation of the mechanisms so far described, with the galvanometer pointer 20 in normal position over the space between the ends of the contacting members 29 and 30, the parts will be in the position shown in Figure 5 and as the table 35 oscillates vertically, shoulder 219 of catch member 218 will be hooked over the end of arm 220 and the arm 220 together with rod 221' will be oscillated by the table 35. Oscillation of the rods 38 and 221' actuates the arms 222 and 223 and imparts a vertical reciprocating motion to the links 225 and 243. Until the end of spring 256 is engaged by a pin 237 of wheel 236, pin 247 of arm 248 will be positioned in the vertical slot section 245 of arm 243 so that no actuation of the arm 248 occurs. Reciprocation of the links 225 and 243 actuates pawls 230 and 240 to step the ratchet wheels 232 and 236 together with the pins 237 carried thereby counter-clockwise in Figure 18. As shown, there are teeth in the ratchet wheel 232 and three pins 237 carried thereby so that on each third reciprocation of link 225, a pin 237 will engage the end of spring 256. When this occurs, on the next upward movement of the link 243, spring 256 will force the lower end of this link to the right in Figure 18 so that the pin 247 will be in the slot section 246, and on the next downward movement of the table 35 the link 248 will be depressed forcing the outer end of arm 248 downward. The downward movement of arm 248 breaks the toggle and actuates the link 251, throwing actuating member 253 clockwise in Figures 2 and 18. As member 253 moves to the right in Figure 18, pin 287 of the printing frame 286 is permitted to drop and ribbon frame 286 together with the ribbon 216 is dropped about the pivot 254' until the end of extension 285 engages the stop surface on the irregular star wheel 271 interposed in the path of movement thereof. When the end of the extension 285 engages star wheel 271, the downward movement of the ribbon 216 is arrested with particular color of ribbon allotted to the circuit under control, interposed between the end of the printing hammer 100 and the record sheet 107. After the downward movement of the ribbon carrier is arrested, movement of the member 253 continues, until the shoulder 264 of pawl 262 is advanced over one tooth 214 of the printing hammer actuating member 215 and until the switch actuating pawl arm 267 (Figure 19) has been rotated a sufficient distance by the movement of rod 266 to advance the pawl 269 over one tooth of the ratchet wheel 270 of the multiple switch mechanism. Towards the end of clockwise movement of member 253 the member 259 engages a pin 237 of ratchet wheel 236 bringing the pins 237 of wheels 232 and 236 into alignment and then rotates the wheels 232 and 236 together so that pins 237 are shifted out of engagement with spring 256 releasing the tension of the spring. On the next upward movement of table 35 and link 243, member 253 moves counter-clockwise in Figure 18 and before the edge of the slot 288 engages pin 287 to raise the ribbon carrier, pawl 262 advances actuating member 215 a distance of one tooth and causes a printing impression of the proper color to be made on the record sheet 107. Further counter-clockwise movement of member 253 to the left in Figure 18 causes engagement of the slot 288 with pin 287 raising the ribbon carrying frame 286 about pivots 254'. As the frame 286 is raised the end of rod 298 (Figure 22) engages a projection of the casing section 1 and the pawl carrying arm 295 is rotated counter-clockwise in Figure 22, rotating the ratchet whel 294 a distance of one tooth which by the pinion driven thereby drives the gear 291 and advances the ribbon 216. During the counter-clockwise movement of member 253 pawl arm 267 is actuated causing rotation of the ratchet wheel a distance of one tooth. Rotation of the ratchet wheel 270 rotates the brush arm 279 and the brushes 281 and 282 to a new set of switch contacts 276 and 277 connecting another circuit to be controlled to the contacting galvanometer mehanism, and rotating the star wheel 271 to present a new stop surface to the end of the ribbon controlling extension 285. As the tension of spring 256 is relieved by the movement of pin 237, on the next downward movement of link 243, pin 247 will be positioned in slot 245.

With the actuating member 253 at the end of its counter-clockwise movement as shown in Figure 18, ribbon 216 will be raised above the end of the printing hammer and a slight downward movement of the frame is necessary to interpose the lower portion of the ribbon between the end of the printing hammer and the record sheet. With the arrangement shown, by providing suitable stop surfaces on star wheel 271 for the different switch position, and utilizing a multi-colored ink ribbon, a different colored record of conditions may be made for each circuit controlled by the mechanism. In the form of invention shown, a three colored ribbon is provided, and for controlling six circuits, twelve sets of contacts 277 and 278 are preferably provided, diametrically opposite sets of contacts on the cylindrical contact carrying member 275 being connected in parallel and allotted to the same circuit. By this arrangement each circuit is connected to the contacting galvanometer twice during each revolution of the shaft 268 and the star wheel 271, and stop surfaces may be provided on star wheel 271 causing different colored sections of the ribbon to be interposed between the printing hammer and the record sheet for the diametrically opposite contacts allotted to a given circuit. By this arrangement the record for three of the circuits may be made up of single differing colors, while the record for the three remaining circuits may be made up of alternate imprints of two colors. In this way only three colors, for example, red, green and black, may be provided on the ink ribbon, while readily distinguishable records are provided for each controlled circuit. It will be obvious that various combinations of colored records may be made in this way, with a relatively few colors on the inking ribbon. For example records may be made from the single color and from combinations of two, three, or more colors for different circuits, so that relatively few colors may be utilized to provide a greater variety of distinguishable records for separate circuit.

With the brushes 281 and 282 positioned to connect a particular circuit to be controlled to the contacting galvanometer mechanism, if the conditions to be controlled have deviated from normal the galvanometer pointer will be deflected in accordance with the nature of the deviation and will actuate either trip member 27 or 28, setting into operation the switching mechanism to effect a restoration of a condition towards normal, and adjusting belt 93 together with the printing hammer to indicate the amount of deviation from normal as above set forth in detail. Tripping of either member 27 or 28 will tilt latch member 217 clock-wise in Figure 5 about the pin 33 as a pivot, and will disengage the shoulder 219 of the latch 218 from the end of the arm 220. Arm 220 will be moved upward with table 35 due to engagement of the projection 221 with the table, and will remain in its uppermost position until shoulder 219 re-engages the end of arm 220 and pawl 230 will not be actuated. Table 35 will, however, continue to oscillate and reciprocation of link 243 will continue with pin 247 of arm 248 in slot section 245. For each oscillation of the table and corresponding reciprocation of the link 243, pawl arm 238 will be raised and lowered causing the pawl 240 to advance the ratchet wheel 236, together with pins 237 carried thereby, one tooth of the ratchet wheel 236. The advance of the ratchet wheel 236 will continue step by step until the galvanometer pointer 20 is restored to normal, or until a pin 237 of wheel 236 has been rotated into a position where the spring 256 will be engaged thereby. Assuming a pin 237 engages spring 256 before the galvanometer pointer reaches normal, slot section 246 will be moved over pin 247 and on the next downward movement of the link 243, arm 248 is forced downward causing the positioning of the proper colored section of the ribbon 216 between the printing hammer. On the following upward movement of link 243, a printing impression is made indicating the position of the hammer 100, and the shaft 268 together with the brushes 281 and 282 and the star wheel 271 are shifted to the next set of contacts 277 and 278, connecting the galvanometer and the adjusting switch mechanism to the succeeding circuit as above set forth. In event the conditions are restored to normal so that the galvanometer needle 20 will return to its normal zero position before a sufficient number of steps of the ratchet wheel 236 have been made to complete the movement of a pin 237 thereof into engagement with the spring 256, on the next upward movement of table 35 neither member 27 nor 28 will trip, and as the table 35 reaches the end of its upward movement, the inclined end of the catch member 218 will engage the end of the arm 220 and the catch arm 218 will be cammed outward until the shoulder 219 thereof hooks over the end of arm 220. On the next downward movement of the table, arm 220, together with the arm 222, will be moved downward, causing depression of the link 225 and advancing pawl 230 over a tooth of ratchet wheel 232. On the next upward movement of the table 35 link 225 and arm 226 will be actuated raising pawl 230 and advancing the ratchet wheel 232 until a pin 237 thereof engages spring 256 and causes a printing and setting operation as above set forth. To guard against false operation, in case the galvanometer pointer is not immediately deflected from normal when the multiple switch brushes 281 and 282 are shifted to a new circuit requiring correction, three steps of the ratchet wheel 232 are necessary to bring the next pin 237 thereof into engagement with the end of the spring 256, to cause operation of the arm 248 and the actuation member 253. This allows ample time for the pointer to assume a proper position and to permit a substantial number of correcting steps to be taken before operation of the ratchet wheel 236 which brings a pin 237 into engagement with spring 256.

It will be seen that a novel multiple circuit switching control mechanism is provided in which a predetermined maximum number of correcting steps is allotted to each circuit, depending upon the number of teeth in the ratchet wheel 236. In arrangement shown the switching mechanism is shifted and the succeeding circuit is seized as soon as normal conditions are established in a circuit under control, and if a circuit is operating under normal conditions when seized the switching mechanism will immediately be operated to seize the next circuit. The mechanism is accordingly connected to a particular circuit for a period of more than two correcting steps only when the conditions controlled thereby have deviated from normal. It will be obvious to those skilled in the art that my improved switching mechanism is adaptable to various types of contacting galvanometers and correcting mechanisms, and the principles thereof are not limited in use in combination with the particular mechanism shown.

The mechanism shown in Figure 18 may be modified as shown in Figure 18A. In this form of the invention, ratchet wheel 232 and pins 237 carried thereby are eliminated and stop pin 241 for the ratchet arm 238, instead of being fixed in the side plates 110, is secured in an oscillating arm 226a, the outer end of which is connected by means of the pin 227 to the lower end of link 225 and the inner end of which is pivotally mounted on pin 234. The spring 256', in this form of invention, is a helical spring, the ends of which are connected to reciprocating link 243 and an arm 256a. Arm 256a is pivotally supported on its upper end on an extension of rod 38, and is normally held against a stop pin 256b supported in the side plate 110 by spring 256'. At its lower end the arm 256a is provided with a curved surface 256c and with a cam surface 256d adapted to be engaged by the pins 237 of the ratchet wheel 236. With surface 256c engaged by a pin 237 the axis of curvature of the surface coincides with the axis of pin 234. Member 259 of the mechanism shown in Figure 18 is eliminated and an arm 259a pivoted to the member 253 by the pivot pin 259b is substituted therefor. The arm 259a rests by its weight against a pin 237 of the ratchet wheel 236 and is provided with shoulders 259c and 259d adapted to engage pins 237 as more fully hereinafter set forth. The remaining parts of this form of invention are the same as, and function in the same manner as the similarly designated parts hereinbefore described.

In operation of this form of invention, when shoulder 219 (Figure 5) is disengaged from the end of arm 220 due to a deflection of the galvanometer pointer 20 from normal position, link 225 and arm 226a together with a stop pin 241 for the pawl arms 240 will be in their uppermost position and as arm 223 and link 243 are reciprocated, a movement of the pawl arm 238 and pawl 240 through an angle of one tooth only of cam 236 will be permitted. Accordingly, while the galvanometer needle is deflected from normal, the ratchet wheel 236 will be advanced a distance of one tooth for each reciprocation of table 35. When galvanometer pointer 20 is in normal position, shoulder 219 will hook over the end of arm 220 and as the table reciprocates a simultaneous reciprocating motion will be imparted to links 225 and 243 and the arms 226ª and 238 as more fully hereinbefore set forth. Under these conditions stop pin 241 will be oscillated in a manner permitting maximum oscillation of pawl arm 238 and the pawl 240. This angular movement of arm 238 may carry pawl 240 over from two to twelve or more teeth of the ratchet wheel 236. The parts are, however, preferably so arranged that under these conditions the pawl 240 will advance over seven teeth of the ratchet 236 so that when the galvanometer pointer is in normal position, the ratchet wheel 236 will be advanced a distance of seven teeth for each vertical reciprocation of the table 35 and the connected parts.

Rotation of the ratchet wheel 236 moves pins 237 carried thereby successively into engagement with the surfaces 256d and 256c of the pivoted arm 256a. Surface 256d is proportioned so that when a pin 237 comes into engagement therewith, a motion corresponding to an advance of ratchet wheel 236 of one tooth is sufficient to advance the pin over the cam surface 256d into engagement with the cam surface 256c. Cam surface 256d is preferably of such length that an advance of the single maximum step of wheel 236 is not sufficient to carry a pin 237 completely across and off surface 256c. With a maximum step of seven teeth of ratchet 236, the length of the surface 256c is preferably such that the advance of ratchet wheel 236 through an angular distance of eight teeth or more is necessary to carry a pin 237 across and off surface 256c.

In operation of the mechanism shown in Figure 18—A so long as the arm 256a is against stop pin 256b, the tension of spring 256' is insufficient to shift the link 243 so that lateral slot section 246 will be forced over pin 247 when the link 243 reaches the upper end of its reciprocating motion, and slot section 245 will reciprocate over the pin 247. When, however, a pin 237 engages and rides over the cam surface 256d, and engages the cam surface 256c, arm 256a will be forced clockwise, tensioning the spring 256' sufficiently to force the link 243 clockwise about its pivot 244 positioning lateral slot section 246 over the pin 247 at the end of the upper movement of the arm 243. On the next downward movement of the arm 243, member 253 will be actuated in a clockwise direction as more fully described in connection with Figure 18 to cause a printing impact and switching of the mechanism to a succeeding circuit.

Before the member 253 reaches the limit of its clockwise movement, shoulder 259c of arm 259a will pass a pin 237 of wheel 236 and arm 259a will rotate slightly counter-clockwise until the surface 259d thereof engages pin 237. As member 253 rotates counter-clockwise in its restoring movement, shoulder 259c engages this pin 237 and rotates ratchet wheel 236 counter-clockwise through an angle sufficient to carry the pin 237 engaging the surface 256c a sufficient distance beyond the end of the surface 259d to insure that the mechanism is carried to a definite starting point to control the succeeding circuit and start a new cycle of operation. When the maximum step of ratchet wheel 236 is a distance of seven teeth, the movement of the pin 237 beyond the surface 256c should be at least a distance of six teeth of the ratchet wheel 236. This insures that ratchet wheel 236 is always carried to a definite starting point for the following cycle, even though two successive steps of maximum length are taken immediately after a pin engages surface 256d. The maximum number of correcting steps that may be taken on a given circuit is determined by the number of teeth on wheel 236. If it is desired to allot a maximum of 20 correcting steps of the mechanism for each circuit to be controlled, with a maximum step of the ratchet wheel corresponding to 7 teeth, 34 ratchet teeth must be provided for each pin 237. This will allow 20 teeth for the correcting steps, 7 teeth to carry the pin across the surface and 14 teeth to carry the ratchet wheel across and beyond the surface 259d to provide for the bringing of the mechanism positively into a definite starting position for the beginning of each cycle of operation.

In this form of invention, so long as the galvanometer pointer 20 is in normal position, the ratchet wheel 236 will be advanced seven teeth for each reciprocation of table 35, until a pin 237 is brought into contact with a surface 259d, when a printing operation will occur and the mechanism is connected to a new circuit and set to the starting position. As soon as a deflection of the galvanometer pointer 20 occurs, ratchet wheel 236 will be advanced one tooth at a time until the galvanometer restores to normal position or until the maximum number of steps allotted to the circuit have been taken, when the printing operation occurs, and the mechanism is connected to the succeeding circuit in a manner above set forth.

The contacting galvanometer and adjusting mechanism for belt 93 may be modified as shown in Figures 23 and 24 in which like reference characters have been utilized to designate parts similar to those used in the form heretofore described and the description of these parts will not be repeated. In this form of the invention the table 35 is provided with an actuating pin 301 resting on a cam 302, which is shaped to impart the desired oscillating vertical movement. Cam 302 is secured to and driven by a shaft 303 suitably journaled and supported from the frame work 304. Secured to and driving the shaft 303 is a worm wheel 305 which meshes with and is driven by a worm gear 306 in turn supported on and driven by the motor shaft 307. Formed in the ends of extensions 58 and 59 of trip members 27 and 28, are slots 308 and 309 into which the pins 310 and 311 are adapted to fit. Pins 310 and 311 are secured in extensions of pawl actuating members 312 and 313 which are pivotally secured to the frame work by means of the pins 314. Springs 315 normally urge actuating members 312 and 313 about their pivots 314 in a direction to throw their end extensions 316 and 317 outward from the position shown in Figure 23. Formed integrally with the members 312 and 313 are the restoring and inter-locking extensions 318 and 319 which are adapted to be engaged by a restoring pin 320 secured in a collar 321 mounted on shaft 303. Secured to the ends of extensions 316 and 317 are the inner ends of the pawl actuating rods 66 and 67, the outer ends of which are secured to the free ends of driving pawl members 68 at points substantially in alignment with the center of rotation of the knurled driving disc members 69 and 70. Members 69 and 70 are rigidly secured to the upper ends of the spindles 71 and 72, supported in suitable brackets 322 which are supported from the frame work 304. Secured to the lower ends of the spindles 71 and 72 are the driving pulleys 91 and 92 for the pen carrying copper or metallic belt 93. Pivotally supported on the spindles 71 and 72 directly beneath the knurled discs 69 and 70 are the actuating arms 323 to which the pawl members 68 are pivotally secured by means of the pins 324. Formed integrally with the arms 323 are the extensions 325 which are pivotally connected at their outer ends by means of pins 326 to the ends of links 327. The opposite ends of the links 327 are connected by means of pins 328 to the ends of the arms 329 which in turn are rigidly secured to and rotatable with the bevel gears 330. Bevel gears 330 mesh with and are continuously rotated by the bevel gears 331 which are rigidly secured to and driven by the shaft 303. Connected to the ends of extensions 316 and 317 are the rods 332 which are connected at their outer ends to ends of arms 333. Arms 333 are pivoted at 334 to the frame work 304 and ends 335 thereof extend into the path of movement of suitable extensions 336 of the pen carrying member 99 mounted on the belt 93.

In operation of this type of mechanism a motor (not shown) drives the shaft 307 continuously which in turn drives the shaft 303 and gears 331 imparting continuous rotation to the gears 330 and the arms 329. Arms 329 through the links 327 actuate the pawl carrying arms 323 and impart thereto a variable oscillation with a quick return substantially as shown in Figure 23, about the spindles 71 and 72. With the parts in the position shown in Figure 23, the rods 66 and 67 hold the pawls 68 out of engagement with the knurled discs 69 and 70 and so long as the galvanometer needle or pointer 20 remains in normal position the pawls 68 will be held in this position, and no rotation will be imparted to the discs or ribbon driving pulleys 91 and 92 actuated thereby. During each revolution of the shaft 303 the cam 302 will impart a complete vertical reciprocation to the table 35, the relation of parts being such that the upward movement of the table is coincident with the inward or adjusting movement of the arms 323, the downward or restoring movement of the table being a quick return movement and occurring substantially during the pause of arms 323 while connecting links 327 are passing through the dead center position shown in Figure 23. During the latter part of this pause, pin 320 will engage the ends of the arms 318 and 319 and will cause a sufficient rocking movement of the members 312 and 313 about their pivot pins 314 to permit passage of the pin 320 between the ends of the extensions 318 and 319, and a slight movement of pins 310 and 311 in the slots 308 and 309.

When a deflection of the pointer 20 from normal occurs, as the table 35 moves upward, the inclined edge 31 or 32 of the contacting member 29 or 30 will come into engagement with the pointer 20 at a point in the cycle of upward movement of table 35 and adjusting movement of the arm 323 depending upon the amount of deflection of the pointer. As the surface 31 and 32 engages the pointer 20, the pointer will be forced upward slightly until it abuts against stop member 25 and on further movement of the table the corresponding trip member 27 or 28 will be rotated about the pivot pins 33, raising the corresponding trip extension 58 or 59 and freeing pin 310 or 311 from engagement with the slot 308 or 309. Freeing of pin 310 or 311 permits movement of the corresponding member 312 or 313 about its pivot 314 under the influence of spring 315 and throws the end of extension 316 or 317 outward. Outward movement of the extension 316 or 317 actuates the rod 66 or 67 connected thereto which in turn throws a pawl 68 into engagement with the corresponding knurled disc 69 or 70, establishing a driving connection and causing rotation of the corresponding discs 69 or 70 with its arm 323 to the end of the adjusting stroke of the arm. Rotation of the disc 69 or 70 drives spindle 71 or 72 and the pulley 91 or 92 effecting an adjustment of the belt 93 corresponding in direction and extent to the direction and extent of deflection of pointer 20 from normal.

It will be noted that when member 312 or 313 is tripped, the end of the corresponding extension 318 or 319 will be moved to such a position that during the remainder of the cycle of operations, the other of the arms 313 or 312 will be locked against movement even though the corresponding pin 310 or 311 should be accidentally released. This interlocking feature permits only one of the pawls 68 to be tripped at a time and prevents injury to the mechanism in event of simultaneous release of members 27 and 28.

At the end of the adjusting movement of the arms 323, the arms pause before moving outward in Figure 23, and the table 35 is dropped. As the table 35 approaches the bottom of its downward movement, the lower side of the released trip member 27 or 28 will engage the restoring rod 26. The released trip member will be rotated upward about the pivot 33 bringing the corresponding extension 58 or 59 in position to engage the pins 310 and 311 in slot 308 or 309. As the members 27 and 28 are restored to latching position, pin 320 engages extension 318 or 319 of the released member 312 or 313, rotating the released member about its pivot 314 moving extension 316 or 317 inward, and positioning pin 310 or 311 so that as the restoration of the member 27 or 28 to latching position is completed, the released pin 310 or 311 will enter into the corresponding slot 308 or 309 latching the parts in the position shown in Figure 23, with the pawls 68 out of engagement with the discs 69 and 70, after which arms 323 move outward and complete a cycle of operation. The cycle of operation as above set forth will be repeated for each revolution of shaft 303 and so long as the pointer 20 is deflected from normal position, adjustments of the disc 69 or 70, and the belt 93 proportional in amount and corresponding in direction to the extent and direction of deflection of pointer 20 from normal.

When the deviation from normal in either direction has proceeded to such an extent that the pen approaches the limit of its movement a projection 336 of the pen carrying member 99 engages the end 335 of an arm 333 shifting the arm about its pivot 334 and actuating the corresponding rod 332 to force extension 316 or 317 inward and to move rod 66 or 67 to shift the corresponding pawl 68 out of engagement with the knurled disc 69 or 70, disconnecting the belt and preventing further movement of the belt in a direction away from the normal position.

This mechanism provides a simple mechanical means for operating a recording instrument under the control of a contacting galvanometer and it will be obvious to those skilled in the art that it may be substituted for the adjusting mechanism and utilized with the remaining mechanisms in the form of invention shown in Figures 1 to 22.

In Figures 25, 26 and 27, a still further modification of the adjusting mechanism is shown. In this form of the invention the table structure 35 is pivotally supported from a framework by the separate pivot pins 38 (Figure 25), the centers of which are in alignment with the ends of extensions 58 and 59 of trip projections 27 and 28 which are pivotally mounted on the rod 33 supported on table 35. Table 35 is provided with actuating extension 337, the end of which rests on an actuating arm 338 which is pivotally supported at 339 from the framework 304. An extension 340 of the arm 338 is held by the weight of parts against the periphery of a cam 341 which is supported on and driven by a shaft 342. As the cam 341 is rotated, the arm 338 is oscillated, a relatively slow upward movement, a quick downward or return movement being imparted to the table 35. Shaft 342 is suitably journaled in bearings supported from the framework 304 and is continuously driven by gear 344, which in turn meshes with and is driven by a pinion 345 supported on and secured to shaft 346. Shaft 346 is continuously driven from a suitable motor 347 through the worm wheel 348 and the worm gear 349 mounted on the armature shaft of the motor. Mounted on and driven by the shaft 342 are kick-out cams 350, the high points of which are adapted to engage the restoring extensions 351 of a pair of pawl members 352 pivotally supported from framework 304 by means of the pins 353. The pawl members 352 are held by their weight with stop projections 354 thereof normally in engagement with the ends of the trip extensions 58 and 59 of the trip members 27 and 28. Pawl members 352 are each provided with a tooth or projection 355 which is adapted to engage the teeth of the ratchet wheels 356 and 357 (Figure 27). Ratchet wheels 356 and 357 are secured to sleeves 358 which in turn are rotatably supported on the shaft 359. Shaft 359 is continuously driven through a friction clutch member 360 from the drive shaft 346. Rigidly secured in the ratchet wheel 356 is a pin 361 upon which a pinion 362 is rotatably supported. Pinion 362 meshes with a pinion 363 rigidly secured to shaft 359 and with an internally toothed ring gear 364. The ring gear 364 is rigidly connected by a cylindrical member 365 to a spur gear 366 which in turn is secured to a sleeve 366′ journaled on the shaft 359 and to which is secured a pin 367. Journaled on the pin 367 is a differential pinion 368 which meshes with a pinion 369 rigidly secured to shaft 359, and with an internally toothed ring gear 370. Ring gear 370 is rigidly secured to and rotatable with the ratchet wheel 357. Meshing with and driven by the gear 366 is a gear 371 which is rigidly secured to and drives the shaft 372 suitably journaled for rotation in the framework 304. Supported on and driven by the shaft 372 is a bevel pinion 373 which meshes with and drives a bevel gear 374. Bevel gear 374 is rigidly secured to and drives a vertical shaft 375 supported in the framework 304. Secured to the lower end of the shaft 375 is a ribbon driving pulley 376. Pen carrying ribbon 93 passes over pulley 376 and a pulley 377 rotatably supported from the framework 304 by means of the vertical spindle 378.

In operation of this form of device, the motor 347 drives continuously shaft 359 through the shaft section 346 and the slip clutch 360, and drives shaft 342 continuously through the gears 343 and 344. Cam 341 causes continuous oscillation of the table 35, and due to the fact that the projections 354 of the pawl members 352 engage the ends of the trip members 58 and 59 in alignment with the center of the pivot pins 38, pawls 352 will be held out of engagement with the ratchet wheels 356 and 357 under normal conditions. Under normal conditions the relative resistances to motion are such that gear 366 together with the shaft 372 and the ribbon drive pulley 376 will remain stationary and pinion 363 will rotate the pinion 362 which will roll on the internal teeth of the ring gear 364, rotating the ratchet wheel 356 while pinion 369 will drive the pinion 368 which is held stationary and will rotate the ring gear 370 and ratchet 357 in reverse direction from the rotation of ratchet wheel 356. When a deflection of the galvanometer pointer 20 from normal occurs as table 35 moves upward the edge 31 or 32 of the contacting member 29 or 30 will engage the pointer at a period in the cycle of movement of the table 35 depending upon the direction and extent of the deflection from normal, forcing the pointer 20 against the upper stop member 25. As a result the corresponding extension member 58 or 59 of the trip member 27 or 28 will be rotated upward out of engagement with the projection 354 of the pawl 352 controlled thereby, releasing the corresponding pawl 352 and permitting the projection or tooth 355 of the released pawl to engage the ratchet wheels 356 or 357, arresting the rotation of the engaged ratchet wheel. Assuming that the pawl 352 individual to the ratchet wheel 356 is released, the rotation of the ratchet wheel 356 will be arrested holding the pin 361 stationary, and the ring gear 364 together with the gear 366 will then be driven by pinion 362 rotating the shaft 372 in a direction which will drive the pen carrying ribbon 93 to the left in Figure 26. This rotation of the gear 366 and shaft 372 will continue until the table 35 reaches the end of its upward movement when extension 340 of arm 338 will drop off the high point of cam 341, and a cam 350 will engage the extension 351 of the released pawl 352 rocking the released pawl about its pivot 353. This movement of the released pawl moves its tooth 355 out of engagement with the ratchet wheel 356 and moves extension 354 thereof to a position where it may re-engage the ends of the extension 358. As the table 35 reaches the bottom of its downward movement trip member 27 will engage the restoring rod 26, and will be moved about its pivot 33 to a position again latching the release pawl 352 out of engagement with the ratchet wheel 356. As soon as the tooth 355 moves out of engagement with the ratchet wheel 356, ratchet wheel 356 will again start into rotation and the gear 366 together with the shaft 372 and the belt 93 will come to rest in a new position.

When the deflection of pointer 20 is in the opposite direction so that the pawl controlling the ratchet wheel 357 is released, ratchet wheel 357 will be brought to rest and pinion 368 will roll on the teeth of the ring gear 370 causing rotation of the gear 366, gear 371, and shaft 372 in a reverse direction so that the movement of the pen carried by belt 93 will be to the right in Figure 26, and this movement will continue until the corresponding cam 350 moves tooth 355 of the released pawl 352 out of engagement with the ratchet 357 at the end of the upward movement of the table after which the parts will be restored to their normal position as above set forth.

In this form of the invention it will be seen that adjustments of the belt 93 are made proportional in amount and in a direction corresponding to the amount and direction of deflection of the galvanometer needle from normal, the adjustments being made by reversing the direction of a single drive shaft for the belt 93, rather than the driving of different shafts as carried out in the forms of the invention heretofore described. It will also be apparent to those skilled in the art that this adjusting mechanism may be utilized in connection with the recording instruments and the remaining control apparatus set forth in connection with the auxiliary mechanism disclosed in Figures 1 to 22 and for various other purposes.

It will be obvious to those skilled in the art that novel, mechanical adjusting, recording, and control mechanisms have been provided, the various combinations and subcombinations of which are useful independently in different combinations, and that while preferred embodiments of the invention have been disclosed in detail, wide variations may be made therein in the various elements and combinations without departing from the spirit of my invention. Accordingly, what is desired to be secured by Letters Patent and claimed as new is:

1. In a recording mechanism, a record sheet; an ink ribbon; a printing hammer adapted to impact said ink ribbon against said record sheet; a contacting galvanometer mechanism controlling the position of said printing hammer; and means controlling said galvanometer mechanism for operating said printing hammer.

2. In a potentiometer recording mechanism, a contacting galvanometer; a multi-point switch adapted to connect said galvanometer successively to a plurality of electrical circuits; a recording mechanism controlled by said galvanometer and adapted to make an independent record individual to each of said circuits; means for varying the color of the record individual to each circuit and means for operating said multi-point switch to switch said galvanometer from one to another of said electrical circuits as soon as a balanced condition is obtained in the one circuit to which it is connected.

3. In combination, balanced type electrical recording mechanism; a multi-point switch adapted to connect said recording mechanism to a plurality of circuits; and means associated with said multi-point switch for causing said recording mechanism to print records of varying color combinations for each circuit and means for switching said recorder to record conditions in another of said circuits as soon as a balanced condition is obtained.

4. In a multiple potentiometer recorder, a potentiometer current therefor, a single printing hammer; means for controlling said hammer to make independent records for different conditions to be recorded; and means for interposing different colors of a multi-colored ink ribbon between said printing hammer and said record sheet to make distinguishable records of the independent conditions to be recorded and means for switching said potentiometer recorder to record another of said conditions as soon as a balanced condition is established in said circuit.

5. In combination with a contacting galvanometer mechanism operable in cycles; a plurality of control circuits; a multiple point switching mechanism adapted to connect said galvanometer to said control circuits in succession; means for allotting a maximum predetermined number of cycles of operation of said contacting galvanometer mechanism to each circuit; and means for shifting said switching mechanism to a succeeding circuit upon completion of a smaller number of cycles of operation than said maximum number allotted to the circuit connected thereto.

6. In combination with a recording and control mechanism; a plurality of control circuits; switching mechanism for seizing said control circuits in succession to said recording and control mechanism; and means for shifting said switching mechanisms to seize the succeeding circuit and to simultaneously operate said recording mechanism to indicate the final condition of the preceding circuit after a sufficient variable number of cycles of operation.

7. In combination with an electrical recording and control mechanism operable in steps; a plurality of circuits to be controlled in succession thereby; a switch; and means controlled by said mechanism controlling said switch to connect said mechanism to a succeeding circuit immediately upon the restoration of a circuit under control to a predetermined desired condition, or after a predetermined number of steps of said mechanism have been taken without restoring the condition under control to a predetermined desired condition; and means for recording the condition on each circuit after the completion of the control operations thereon.

8. The combination as set forth in claim 7 together with means for adjusting said switch operating mechanism to a predetermined starting position on each actuation thereof.

9. In combination, a galvanometer, a plurality of control circuits, a multi-colored ribbon, an operating circuit individual to each of said colors on said ribbon, means for switching said galvanometer from one to another of said control circuits and for simultaneously associating said control circuits with said operating circuit whereby said individual colored portion of said ribbon is rendered operative under control of said galvanometer, said means being operative to associate combinations of said operating circuits with others of said control circuits whereby successive colored portions of said ribbons are rendered operative under control of said galvanometer, when said control circuits are associated therewith.

10. In combination, a star-wheel, having cammed portions thereon, a multi-colored ribbon, a pivoted frame therefor, a plurality of control circuits, a mechanical connection from said ribbon frame to said cam portions on said star wheel, a plurality of control circuits, a galvanometer, means for switching said galvanometer from one to another of said control circuits and for simultaneously rotating said star wheel whereby said ribbon frame is rocked about its pivot, a variable amount by means of said mechanical connection in accordance whereby different colored portions of said multi-colored ribbon are rendered operative simultaneously with the switching of said galvanometer from one to another of said control circuits.

11. In combination, a galvanometer, comprising a deflecting member, a pair of latched mechanisms, a pen, means responsive to the deflection of said deflecting member for releasing one of said latched members, a lever connection controlled by said latched member, a source of power connected to said recording mechanism by said lever when operated by said released latched member and means operated when said recorder has moved to a predetermined position for operating said lever to disconnect said recorder from said source of power.

12. In combination, a recorder, a source of power, a lever mechanism, a galvanometer including a deflecting member, means responsive to the deflection of said deflecting member for operating said lever mechanism to connect said source of power to said recording mechanism and means responsive to the said recording mechanism, when in a predetermined position, for operating said lever mechanism in the opposite direction for disconnecting said source of power from said recording mechanism.

13. In combination, a recorder, a galvanometer including a deflecting member, means responsive to the deflection of said deflecting member for operating said recording member in accordance with the extent of deflection of said deflecting member and means for rendering said recording mechanism non-operative after it has moved to a predetermined position.

14. In combination, a recorder, a galvanometer including a deflecting member, means responsive to the deflection of said deflecting member for operating said recording member in accordance with the extent of deflection of said deflecting member and means for limiting the extent of movement of said recording mechanism.

15. In combination, a recorder, a galvanometer including a deflecting member, means responsive to the deflection of said deflecting member for operating said recording member in accordance with the extent of deflection of said deflecting member and means controlled by said recording mechanism for limiting the extent of movement thereof.

16. In combination, a plurality of control circuits, a galvanometer, means for associating said galvanometer in succession with said control circuits for operation in accordance with changes therein; means operative after a predetermined interval of association with any of said control circuits for switching said galvanometer to the succeeding control circuits, and means operative before said interval in the event that no substantial changes are occurring in said first mentioned control circuit for switching said galvanometer before the completion of said interval to the succeeding control circuit.

17. In combination, a galvanometer, a plurality of control circuits, temperature responsive means in said control circuits for varying the current flow therein, said galvanometer operating in response to variations of said currents, switching means for associating said galvanometer with one of said control circuits for operation in accordance with changes of current flow therein, means for operating said switching means after a predetermined interval of time to associate said galvanometer with another of said circuits, and means operative before said predetermined interval for operating said switching device to associate said galvanometer with said other circuit before the completion of said interval in the event that no substantial current changes occur in the control circuit to which the galvanometer is connected.

18. In combination, a galvanometer, a plurality of control circuits, a recording device, a potentiometer balance circuit connected to said galvanometer, temperature responsive means in each control circuit, switching means for associating said galvanometer with one of said control circuits, said galvanometer being responsive to current variations in said circuit due to unbalance of said potentiometer for restoring the balance of said potentiometer circuit, said recorder being operated responsive to the balancing of said circuit, means operative after a predetermined interval of time for operating the switching device for associating said galvanometer with another of said control circuits, and means operative before the completion of said predetermined interval for operating said switching device to switch the galvanometer to said other circuit in the event said potentiometer balance is obtained before said interval.

19. In combination, a galvanometer, a potentiometer balance circuit therefor, a recording device, a plurality of control circuits for said galvanometer, temperature responsive means individual to each of said control circuits, means for varying the current flow in said circuits in accordance with temperature changes from a predetermined value, means for associating said galvanometer with one of said control circuits, said potentiometer circuit being unbalanced in accordance with the temperature variations, said galvanometer being responsive thereto for restoring the balance of said potentiometer circuit, means operative following the balance of said potentiometer circuit for operating the recording device, and means operative before the completion of said interval for switching said galvanometer to another of said control circuits in the event that a potentiometer balance is obtained before the completion of said interval.

20. In a recording system embodying a plurality of control circuits and a galvanometer, and in which the galvanometer controlling the recorder must be balanced before a record is made; the method which comprises associating the galvanometer with a control circuit for recording the variations of current thereover until such a balance is obtained and, switching said galvanometer to the succeeding control circuit immediately thereafter.

21. In a temperature measuring instrument, a galvanometer, a plurality of control circuits, a recording device, a potentiometer balance circuit controlled by said galvanometer, means for associating said galvanometer and balance circuit with one of said control circuits, said balance circuit being unbalanced in accordance with changes in said control circuit, said galvanometer being responsive to said unbalance to restore the balance, means for operating said recorder when a balance is obtained and means responsive to the balance condition obtained in the control circuit with which the galvanometer is associated for switching said galvanometer to the succeeding control circuit.

22. In a temperature measuring instrument, a galvanometer, a plurality of control circuits, a recorder comprising a variable colored indicator, a potentiometer balance controlled by said galvanometer, means for associating said galvanometer and balance circuit with one of said control circuits, said balance circuit being unbalanced in accordance with changes in said control circuit, said galvanometer being responsive to said unbalance to restore the balance means for operating said recorder when a balance is obtained, means responsive to the balance condition obtained in the control circuit with which the galvanometer is associated for switching said galvanometer to the succeeding control circuit, and means for simultaneously associating combinations of colored portions of said variable colored indicators with said galvanometer in the same predetermined order and intervals.

23. In combination, a galvanometer, a potentiometer balance circuit therefor, a recording device including a multi-colored ribbon, a recording sheet, a plurality of control circuits, temperature responsive means in each of said control circuits, means for varying the current flow in said circuits in accordance with the difference between the temperature to be measured and the measuring status of the instrument, means for associating said galvanometer with one of said control circuits only as long as current variations occur and means for simultaneously conditioning a colored portion of said ribbon for recording on said sheet, said last mentioned means being operative for conditioning combinations of portions of said colored ribbon with said recording paper when said galvanometer switches to others of said control circuits.

24. In combination, a galvanometer, a plurality of control circuits, a recorder comprising a pivoted ribbon frame, a ribbon carried thereon, a pulley for moving said ribbon, means for rocking said frame, mechanical connections controlled by said rocking movement of said frame for rotating said pulley to move said ribbon, a potentiometer balance circuit controlled by said galvanometer, means for associating said galvanometer and balance circuit with one of said control circuits, said balance circuit being unbalanced in accordance with changes in said control circuit, said galvanometer being responsive to said unbalance to restore the balance means for operating said recorder when a balance is obtained and means responsive to the balance condition obtained in the control circuit with which the galvanometer is associated for switching said galvanometer to the succeeding control circuit.

25. In combination, a recorder, a pointer including a deflecting member, a pair of trip members, means responsive to the deflection of said pointer for tripping one of said members and means controlled by said trip member for operating said recorder, said pointer being immediately free following the tripping operation of said trip member for operation in accordance with further operations of said galvanometer.

26. In combination, a recorder, a pointer including a deflecting member, a pair of trip members, means responsive to the deflection of said pointer for tripping one of said members, means controlled by said trip member for operating said recorder, said pointer being immediately free following the tripping operation of said trip member for operation in accordance with further operations of said galvanometer, and means operative when said members are in trip position for preventing the other of said trip members from tripping.

27. In combination, a galvanometer having a deflecting member, a plurality of trip members in operative relation therewith, a periodic member operative following the deflection of said galvanometer for operating said trip members whereby said galvanometer deflecting member is again free for operation by said periodic member in accordance with the deflection of said galvanometer and a recorder controlled by said trip member in accordance with the extent of deflection of said galvanometer.

28. In a temperature recording system in which a galvanometer having a deflection member, a periodic member and a trip member is employed, the method of obtaining continuous temperature recording which comprises tripping the trip member in accordance with the deflection whereby the deflecting member is again free for further deflecting operations and operating the recorder under control of the trip member.

29. In combination, a galvanometer in operative relation with each of a plurality of circuits; the conditions of which vary in accordance with variations of a temperature responsive means; a variable colored indicator; means for switching said galvanometer from one to another of said circuits and for simultaneously associating predetermined combinations of colored portions of said variable colored indicator with said galvanometer; means operative following the association of said galvanometer with one of said circuits for balancing the electrical condition of said circuit; means operative after said galvanometer has become stabilized in accordance with the balanced condition of said circuit for operating said indicator to make a record in accordance with the operation of said temperature responsive means; and means for operating said switching means when said balanced condition is obtained and said record made.

30. In combination, a galvanometer having a plurality of control circuits therefor, a plurality of variable colored signalling devices, means for successively associating said galvanometer with one after another of said control circuits, means operative following the association of said galvanometer with one of said control circuits for balancing said galvanometer in accordance with the electrical conditions of the control circuit, means controlled by said galvanometer in accordance with the balancing thereof for operating predetermined ones of said colored signalling devices, and means rendered operative by the balancing of said galvanometer and operation of said signalling devices for switching said galvanometer to another of said control circuits.

31. In combination, a galvanometer having a plurality of control circuits, means for generating variable currents in said control circuits, switching means for associating said galvanometer with each of said control circuits successively, means operative following the association of said galvanometer with one of said control circuits for balancing said galvanometer circuit in accordance with the electrical conditions of the control circuit, a record sheet, an ink ribbon, a printing hammer adapted to impact said ink ribbon against said record sheet, means controlled by said galvanometer mechanism for operating said printing hammer in accordance with the electrical condition of said circuit, and means rendered operative by the balancing of the galvanometer for switching the galvanometer to the next succeeding control circuit.

32. In combination, a galvanometer having a plurality of control circuits therefor, the electrical conditions of which vary in accordance with conditions to be maintained, switching means for associating said galvanometer with each of said control circuits successively, means operative following the association of said galvanometer with one of said control circuits for balancing said galvanometer circuit in accordance with the electrical conditions thereof, a record sheet, a multi-colored ink ribbon, a printing hammer adapted to impact said multi-colored ink ribbon against said record sheet, means controlled by said galvanometer mechanism for operating said printing hammer in accordance with the balanced condition of said circuit and means rendered operative by the balancing of the circuit for switching the galvanometer to the next succeeding control circuit.

33. In combination, a potentiometer recorder having a plurality of control circuits therefor, means for switching said recorder from one to the next of said control circuits, means for operating said recorder in accordance with the electrical conditions of one of said control circuits while said recorder is associated therewith, and means rendered operative by the operation of said recorder for operating said switching means to switch said recorder to the next control circuit.

34. In combination, a potentiometer indicator having a plurality of control circuits therefor, means for switching said indicator from one to the next of said control circuits, means for operating said indicator in accordance with one of said control circuits while said indicator is associated therewith, and means rendered operative by the operation of said indicator for operating said switching means to switch said indicator to the next control circuit.

35. In combination, a potentiometer recorder having a plurality of control circuits therefor, means for switching said recorder from one to the next succeeding control circuit, periodically operating means co-operating with the control circuit associated with the recorder to operate said recorder, and means for operating said switching means to switch said recorder to another of said control circuits after a predetermined number of operations of said periodic means or when said recorder operates in accordance with the condition of the control circuit with which it is associated.

36. In combination, a potentiometer recorder having a plurality of control circuits therefor, means for switching said recorder from one to the next succeeding control circuit, periodically operating means co-operating with the control circuit associated with the recorder to operate said recorder, and means for operating said switching means to switch said recorder to another of said control circuits after a predetermined number of operations of said periodic means or in response to the operation of said recorder if said recorder operates in accordance with the conditions in the control circuit to which it is connected before said predetermined number of operations of said periodic means.

37. In combination, a potentiometer indicator having a plurality of control circuits therefor, means for switching said indicator from one to the next succeeding control circuit, periodically operating means co-operating with the control circuit associated with the indicator to operate said indicator, and means for operating said switching means to switch said indicator to another of said control circuits after a predetermined number of operations of said periodic means or in response to the operation of said indicator if said indicator operates in accordance with the conditions in the control circuit to which it is connected before said predetermined number of operations of said periodic means.

38. In a control system embodying a galvanometer having a pointer which is deflected from a normal position in accordance with the condition of a control circuit to which the galvanometer is connected and a periodically operating member co-operating with said galvanometer pointer when in deflected position for operating a recorder, the method of operation which comprises associating the galvanometer with a first control circuit to deflect the pointer in accordance with the conditions of the circuit and switching the galvanometer to another control circuit as soon as a predetermined condition of the first control circuit is obtained or invariably after a maximum predetermined number of operations of said periodic member.

39. In a control system having a galvanometer and a deflecting pointer, the method of operation which comprises affecting the galvanometer in accordance with the condition of a control circuit to operate a recorder accordingly and switching the galvanometer to be affected by another control circuit, either after an invariable predetermined interval of time or after a maximum predetermined condition of the circuit to which the galvanometer responds is obtained.

40. In a control system having a galvanometer arranged to be switched to each of a plurality of control circuits and having a pointer which is normally in non-deflected position, the method of operation which comprises associating the galvanometer with one of said control circuits for operating a recorder in accordance with the condition of the control circuit as indicated by the deflection of the pointer and shifting the galvanometer to another control circuit invariably after a predetermined interval of time or after the galvanometer pointer has returned to its non-deflected position.

41. In a control system embodying a galvanometer arranged to be switched to each of a plurality of control circuits and having a pointer which is normally in non-deflected position, the method of operation which comprises associating the galvanometer with one of said control circuits for operation in accordance with the condition of the control circuit as indicated by the deflection of the pointer and performing the operation under control of the galvanometer invariably a predetermined interval of time after the galvanometer pointer has returned to its non-deflected position.

42. In a recording system embodying a galvanometer having a pointer which has normal and deflected positions and arranged to be associated successively with each of a plurality of control circuits, the method of operation which comprises associating the galvanometer with one of said control circuits to operate a recorder under control of the pointer and associating the galvanometer to another of said control circuits invariably after a predetermined interval of time or after the pointer is in a predetermined position.

43. In a recording system embodying a galvanometer having a pointer which has normal and deflected positions and arranged to be associated successively with each of a plurality of control circuits, the method of operation which comprises associating the galvanometer with one of said control circuits to operate a recorder under control of the position of the pointer relative to said normal position and associating the galvanometer to another of said control circuits invariably a predetermined interval of time after the pointer is in a predetermined position.

44. In a recording system comprising a galvanometer having a deflecting pointer arranged to be switched from one to another of control circuits and a periodic member for periodically engaging said pointer when in deflected position, the method of operation which comprises operating the recorder and switching the galvanometer from one to another control circuit a predetermined interval after a balanced condition of the circuit to which the galvanometer is connected is obtained or operating the recorder a predetermined interval following a connection of the galvanometer to the control circuit in the event that the galvanometer control circuit does not come to a balance previously.

45. In a combination comprising a member to be controlled and a galvanometer having a deflecting pointer connected in a control circuit, the method of operation which comprises operating the member controlled by said galvanometer and its deflecting member after the galvanometer is in a balanced condition or after a predetermined interval of time following the association of the galvanometer with the member to be controlled.

46. In a combination having a member to be controlled and a galvanometer having a deflecting pointer connected in a control circuit, the method of operation which comprises operating the member controlled by said galvanometer and its deflecting member after the galvanometer is in a balanced condition a predetermined interval of time.

47. In combination, a galvanometer having a deflecting member, switching means for switching said galvanometer from one to another of a plurality of control circuits and means operative following the association of said galvanometer with one of said circuits for operating said switching means either after said galvanometer pointer is in neutral position for a predetermined time interval or invariably after a maximum predetermined interval of time following the association of said galvanometer with said control circuit irrespective of the balanced condition of the galvanometer.

48. In a control system, a self-balancing instrument, a member to be operated thereby, means for balancing said instrument in increments at periodic intervals and means operative after a predetermined number of said intervals during which no further balancing adjustments are necessary for operating said member.

49. In combination, a device to be maintained in a predetermined condition, a galvanometer having a pointer, a movable recording member, means controlled by the position of said pointer relative to a neutral position for operating said recording member to variable positions, and means controlled in accordance with the position of said recorder member after a stabilized condition thereof has been obtained for maintaining said device in the predetermined condition.

50. In combination, a galvanometer having a pointer, a movable recording member, automatic means controlled by the position of said pointer relative to a neutral position for operating said recording member to variable positions, and automatic means variably controlled by the position of said recording member after a stabilized condition thereof has been obtained.

51. In combination, a galvanometer having a pointer, a movable recording member, automatic means controlled by the position of said pointer for operating said recording members to variable positions, and automatic means controlled by the position of said recording member only when said pointer has fully operated said movable recorder to its operating position.

52. In combination, a self-balancing galvanometer having a pointer, a movable recording member, automatic means controlled by the position of said pointer for operating said recording member to variable positions, automatic means controlled in accordance with the position of said recording member after a stabilized condition thereof has been obtained and means for preventing operation of said recording member while said galvanometer pointer is deflected by extraneous causes.

53. In combination, a condition to be maintained, a self-balancing galvanometer having a pointer, a movable recording member, automatic means controlled by the position of said pointer for operating said recording member to variable positions and automatic means controlled in accordance with the position of said recording member after a stabilized condition thereof has been obtained for maintaining said predetermined condition, means for normally preventing operation of said recording member while unbalanced condition is obtained and means whereby said recorder is operated after the lapse of a predetermined interval of time regardless of balanced conditions obtained.

54. In a control system, an instrument having a movable member whose position represents the value of a function according to which the instrument is operated, a governing sensitive element for controlling said instrument, means for adjusting said movable member to a position representative of the value of said function, mechanism operated in accordance with the position occupied by said member comprising a recorder and means for preventing the operation of said mechanism except when said governing sensitive element occupies a predetermined position and for alternatively causing the operation of said mechanism at predetermined periods with respect to the assumption of the given position by the sensitive element.

55. In combination, a galvanometer subject to extraneous mechanical influences, recording apparatus to be controlled by said galvanometer and means whereby said galvanometer controls said apparatus to be controlled only after said galvanometer is in a stabilized condition uninfluenced by said extraneous matter.

56. In combination, a contacting galvanometer mechanism; a recording sheet adapted to receive printed records; a multi-colored ink ribbon; a printing hammer adapted to impact said ink ribbon against said record sheet; means whereby said contacting galvanometer mechanism controls the position of said printing hammer and means under the control of said mechanism controlling the color of said ink ribbon interposed between said printing hammer and record sheet.

57. In combination, a plurality of sources of electromotive force; potentiometer mechanism including a galvanometer, a switch for connecting each source with the mechanism and galvanometer to form a potentiometer circuit, means operating in accordance with galvanometer deflections to balance a potentiometer circuit, and means rendered operative when a potentiometer circuit is balanced for actuating said switch to connect another source to the mechanism and galvanometer.

58. In combination, a plurality of sources of electromotive force, potentiometer mechanism including a galvanometer, a switch for connecting each source with the potentiometer mechanism to form a potentiometer circuit, means operating in accordance with deflections of said galvanometer for balancing the potentiometer circuit, recording means, means rendered operative by a balanced condition of the potentiometer circuit for actuating said recording means and for actuating said switch to connect another source to the potentiometer mechanism and galvanometer.

59. A recorder having a deflectable element, a recording member, a source of power, driving connections between said source and member, means for gauging the position of the deflectable element, a clutch mechanism operated by the gauging operation of said means to connect said recording member to the source of power, said means operating to free the element as soon as its position has been gauged.

60. A recorder having a deflecting member, a device for gauging the position of the member and operating to free the member upon contact therewith, recording mechanism controlled by said device.

61. A potentiometer having a galvanometer and adjustable slide wire unit and a potentiometer circuit joining said galvanometer and slide wire, a device for gauging the position of the galvanometer pointer by contact therewith, said device being constructed and arranged for operation to free the pointer when it makes contact therewith, driving means for adjusting the slide wire unit, and means operated by said gauging device for regulating the adjusting action of the driving means upon the slide wire unit.

62. In combination, a plurality of circuits, a galvanometer, means for associating said galvanometer in succession with said circuits for operation in accordance with changes therein, means operative after a predetermined interval of association with one of said control circuits for switching said galvanometer to a succeeding control circuit, means for gauging the position of the galvanometer and operating the first mentioned means in response to the attainment of a predetermined position by said galvanometer.

63. In combination, a plurality of circuits, a meter, means for associating said meter with any of said circuits for operation in accordance with changes therein, means for gauging that characteristic of the meter which changes with changes in said circuits, and means operated by the second mentioned means upon the attainment of a predetermined status of the meter for operating the first mentioned means.

64. In combination, a plurality of circuits, a meter, first means for associating the said meter with any of said circuits for operation in accordance with changes therein, second means for gauging that characteristic of the meter which changes with changes in said circuits, third means operated by the second means upon the attainment of a predetermined status of the meter for operating the first means, fourth means for operating the first means after a predetermined time interval.

65. In combination, a plurality of circuits, a meter, first means for associating the said meter with any of said circuits for operation in accordance with changes therein, second means for gauging that characteristic of the meter which changes with changes in said circuits, third means operated by the second means upon the attainment of a predetermined status of the meter for operating the first means, fourth means for operating the first means after a predetermined time interval, fifth means operable in conjunction with the operation of the first means for adjusting the third means and the fourth means to an initial setting.

66. In combination, a self-balancing measuring instrument, a plurality of measurable conditions any one of which is operatively associated with the instrument, and means actuated in response to a balanced condition of said measuring instrument for associating another one of the measurable conditions with the measuring instrument.

67. In combination, a measuring instrument, a plurality of measurable conditions any one of which is operatively associated with the instrument, means responsive to the attainment of a predetermined measuring status of the instrument for associating the instrument with another one of the measurable conditions.

68. In a recording potentiometer, the combination with a potentiometer, and periodically operating rebalancing means for effecting rebalancing adjustments of the potentiometer when the latter becomes unbalanced, and intermittently operating recording means, of actuating means for said recorder means, the frequency of operation of which is automatically dependent upon the number of potentiometer rebalancing adjustments necessary to restore potentiometer balance when the potentiometer becomes unbalanced.

69. In a recording potentiometer, the combination with intermittently operating recording means, a potentiometer, periodically operating means for effecting rebalancing adjustments of the potentiometer when the latter is unbalanced, and means for actuating said recording mechanism at a frequency dependent upon the rapidity with which potentiometer balance is effected following a condition of potentiometer unbalance.

70. In a potentiometer recording instrument, the combination of an intermittently operating recording means, a potentiometer periodically operating rebalancing means for effecting rebalancing adjustments of the potentiometer when the latter is unbalanced, and mechanism for actuating said recording means at a frequency dependent upon the rapidity with which potentiometer balance is effected following a condition of potentiometer unbalance, said mechanism comprising means actuated on each operation of said rebalancing means and effective after a predetermined number of such operations to actuate said recorder means, and other means actuated on each operation of each rebalancing mechanism when the potentiometer is in balance and effective after a number of such operations less than said predetermined number to operate said recording means.

71. In a recording potentiometer instrument, the combination with a potentiometer and periodically operating means for effecting rebalancing adjustments of the potentiometer whenever the latter becomes unbalanced, and intermittently operating recording means of actuating means for said recording means comprising a pair of ratchet wheels, pawl means independent of the condition of potentiometer balance for advancing actuation of said rebalancing means, pawl means dependent on the condition of potentiometer balance for advancing the other of said wheels on each such actuation only if the potentiometer is then in balance, means controlled by the last mentioned wheel for operating said recording means after a predetermined movement of the wheel, and means through the latter is advanced by the first mentioned wheel after a predetermined movement of the latter.

72. In combination, a plurality of control circuits each individual to a condition to be controlled; a galvanometer responsive to the conditions to be controlled comprising a pointer held in normal position when the condition under control is at a desired predetermined value; control mechanism responsive to deflections of said galvanometer pointer from normal position tending to restore said conditions to the desired predetermined value; switching mechanism; means actuating said switching mechanism to connect a succeeding circuit to said galvanometer after a curtailed number of successive adjusting operations have been performed on the preceding circuit sufficient to restore the condition individual to the preceding circuit to its predetermined value, and means for recording the condition individual to the circuit to which the galvanometer is connected upon each actuation of said switching mechanism.

73. In combination, a plurality of control circuits each individual to a condition to be controlled; a galvanometer responsive to the conditions to be controlled comprising a pointer held in normal position when the condition under control is at a desired predetermined value; control mechanism responsive to deflections of said galvanometer pointer from normal position tending to restore said conditions to the desired predetermined value, switching mechanism; means operated upon the restoration of a controlled condition to the predetermined value to connect the succeeding circuit to said galvanometer, and means for recording the condition individual to the circuit to which the galvanometer is connected upon each actuation of said switch mechanism.

74. In combination, a measuring instrument, means for producing an operative effect at irregular intervals, and means responsive to the attainment of a predetermined measuring status of the instrument independent of the value of the quantity measured for causing the first mentioned means to produce its said effect.

75. In combination, a measuring instrument, means for producing an operative effect at irregular intervals, and means responsive to the attainment of a predetermined measuring status of the instrument for causing the first mentioned means to produce its said effect on the attainment of said status, or at the end of a predetermined time interval if said status is not attained during said interval.

76. A self-balancing instrument comprising a deflecting galvanometer, a balancing device and actuating means acting at regular intervals to adjust said device in accordance with the deflection of the galvanometer, and in combination therewith, mechanism operating at the end of each of successive measuring periods each of which includes a plurality of said intervals, and means actuated by said actuating means and controlled by the deflection of said galvanometer for setting said mechanism into operation and thereby ending the corresponding measuring period after a plurality of said intervals dependent in number upon the character of galvanometer deflections occurring during said period.

77. A self-balancing instrument comprising a deflecting galvanometer, an adjustable balancing device and actuating mechanism acting at regular intervals to adjust said device in accordance with the deflection of the galvanometer from normal, and in combination therewith, mechanism operating at the end of each of successive measuring periods each of which includes a plurality of said intervals, and means actuated by said actuating means for setting said mechanism into operation at the end of each measuring period and thereby terminating the latter, comprising a member, means through which said member is advanced by said means one step at each interval during a measuring period, said means being selectively controlled by the galvanometer deflection to make the advancement step of the member at each interval greater if the galvanometer is then at normal than if the galvanometer is then deflected from normal, and means rendered operative by a predetermined aggregate advance movement of said member effected during each measuring period to set said mechanism into operation.

78. A self-balancing instrument comprising a deflecting galvanometer, an adjustable balancing device and actuating means acting at regular intervals to adjust said device in accordance with the deflection of the galvanometer from normal, and in combination therewith, mechanism operating at the end of each of successive measuring periods each of which includes a plurality of said intervals, and means actuated by said actuating means for setting said mechanism into operation at the end of each measuring period and thereby terminating the latter, comprising a member, means through which said member is advanced by said actuating means one step at a time at each interval during a measuring period, the last mentioned means being selectively controlled by the galvanometer deflection to make the advancement step of the member at each interval greater if the galvanometer is then at normal than if the galvanometer is then deflected from normal, and a thrust member adjusted by a predetermined aggregate advance movement of said member effected during each measuring period, into position in which said actuating means operates through said member to set said mechanism into operation.

In testimony whereof I affix my signature.

THOMAS RANDOLPH HARRISON.